US009369600B2

(12) United States Patent
Motosugi

(10) Patent No.: US 9,369,600 B2
(45) Date of Patent: Jun. 14, 2016

(54) IMAGE FORMING SYSTEM AND IMAGE FORMING DEVICE FOR PERFORMING CONTROL IN ACCORDANCE WITH USER AUTHENTICATION INFORMATION

(71) Applicant: KONICA MINOLTA, INC., Chiyoda-ku, Tokyo (JP)

(72) Inventor: Toshihisa Motosugi, Okazaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/506,360

(22) Filed: Oct. 3, 2014

(65) Prior Publication Data
US 2015/0022848 A1   Jan. 22, 2015

Related U.S. Application Data

(62) Division of application No. 13/487,913, filed on Jun. 4, 2012, now Pat. No. 9,143,649.

(30) Foreign Application Priority Data

Jun. 6, 2011 (JP) .................................. 2011-125902
Jun. 6, 2011 (JP) .................................. 2011-125903

(51) Int. Cl.
*H04N 1/00* (2006.01)
*G06K 15/00* (2006.01)
*G06F 21/00* (2013.01)
(Continued)

(52) U.S. Cl.
CPC ............ *H04N 1/00973* (2013.01); *G06F 21/00* (2013.01); *G06F 21/31* (2013.01); *G06F 21/32* (2013.01); *G06K 15/00* (2013.01); *G06K 15/402* (2013.01); *G06K 15/4095* (2013.01); *H04N 1/00347* (2013.01); *H04N 1/00838* (2013.01)

(58) Field of Classification Search
None
See application file for complete search history.

(56) References Cited

U.S. PATENT DOCUMENTS 7,624,186 B2 * 11/2009 Tanida .......................... 709/228
8,228,537 B2    7/2012 Uehara
(Continued)

FOREIGN PATENT DOCUMENTS

JP    2002-135508 A    5/2002
JP    2002-342284 A    11/2002
(Continued)

OTHER PUBLICATIONS

Japanese Office Action dated Aug. 27, 2013, issued in counterpart Japanese Application No. 2011-125903.
(Continued)

*Primary Examiner* — Thomas D Lee
(74) *Attorney, Agent, or Firm* — Holtz, Holtz & Volek PC

(57) ABSTRACT

An image forming system includes a plurality of image forming devices connected in data communication with each other via a network. Each of the image forming devices includes a storage unit, an operational unit, and a controller. If one user logs into a first image forming device among the image forming devices, a controller of the first image forming device checks for the existence of a second image forming device into which the user has logged. If the controller of the first image forming device determines the second image forming device into which the user has logged, the controller transmits a logout instruction of the user to the second image forming device.

21 Claims, 31 Drawing Sheets

(51) Int. Cl.
*G06F 21/31* (2013.01)
*G06F 21/32* (2013.01)

(56) References Cited

U.S. PATENT DOCUMENTS

| | | | | |
|---|---|---|---|---|
| 2010/0208295 A1* | 8/2010 | Sato | ............................ | 358/1.15 |
| 2011/0216340 A1* | 9/2011 | Yoshida et al. | .............. | 358/1.13 |

FOREIGN PATENT DOCUMENTS

| | | | |
|---|---|---|---|
| JP | 2005-56301 | A | 3/2005 |
| JP | 2005-79681 | A | 3/2005 |
| JP | 2005-297488 | A | 10/2005 |
| JP | 2005-327123 | A | 11/2005 |
| JP | 2007-58502 | A | 3/2007 |
| JP | 2007058502 | A * | 3/2007 |
| JP | 2007-87128 | A | 4/2007 |
| JP | 2007-152675 | A | 6/2007 |
| JP | 2007-156698 | A | 6/2007 |
| JP | 2007-241952 | A | 9/2007 |
| JP | 2008-176631 | A | 7/2008 |
| JP | 2009-86976 | A | 4/2009 |
| JP | 2010-188692 | A | 9/2010 |
| JP | 2010-206535 | A | 9/2010 |
| JP | 2011-14996 | A | 1/2011 |

OTHER PUBLICATIONS

Japanese Office Action dated Oct. 22, 2013, issued in counterpart Japanese Application No. 2011-125902.
Japanese Office Action dated Apr. 15, 2014, issued in counterpart Japanese Application No. 2011-125903.

* cited by examiner

FIG. 8
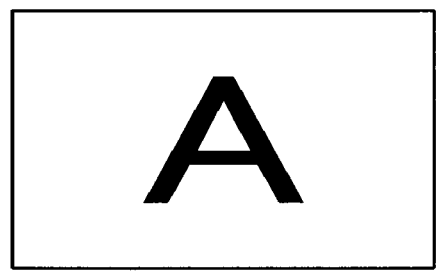
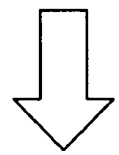
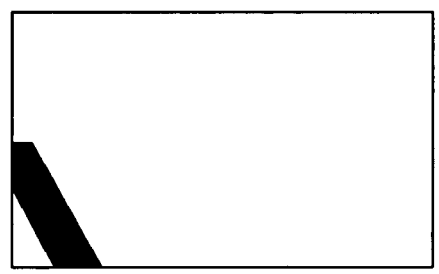
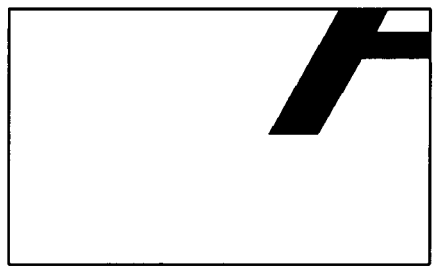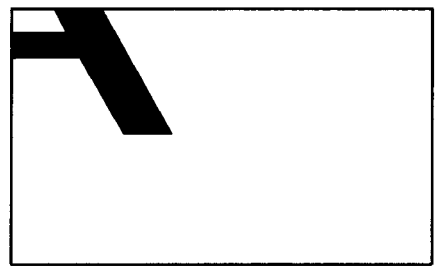

USER A, DO YOU REFLECT FOLLOWING SETTING?

| | MACHINE MODEL | DAY | TIME | FUNCTION |
|---|---|---|---|---|
| 1 | MULTI-FUNCTIONAL PERIPHERAL 10b | 2011/02/22 | 15:25 | COPY |

PAPER SIZE: A4, NUMBER OF DOCUMENTS: FIVE, MAGNIFICATION: 70.7%
SINGLE-SIDED PRINTING TO DOUBLE-SIDED PRINTING, 2in1, SORTING
★ REFLECTION-IMPRACTICABLE: CORNER STAPLING ⇒ "NO STAPLE" IS SHOWN — *C7*

| YES | NO |
|---|---|
| *C8* | *C9* |

YOU CAN MAKE COLOR COPY.

5

| PAPER SIZE: A4 | MAGNIFICATION: 70.7% |
|---|---|
| DOCUMENT TO COPY SINGLE-SIDED PRINTING TO DOUBLE-SIDED PRINTING 2in1 | SORTING MODE SORTING |
| STAPLING CORNER | APPLICATION |

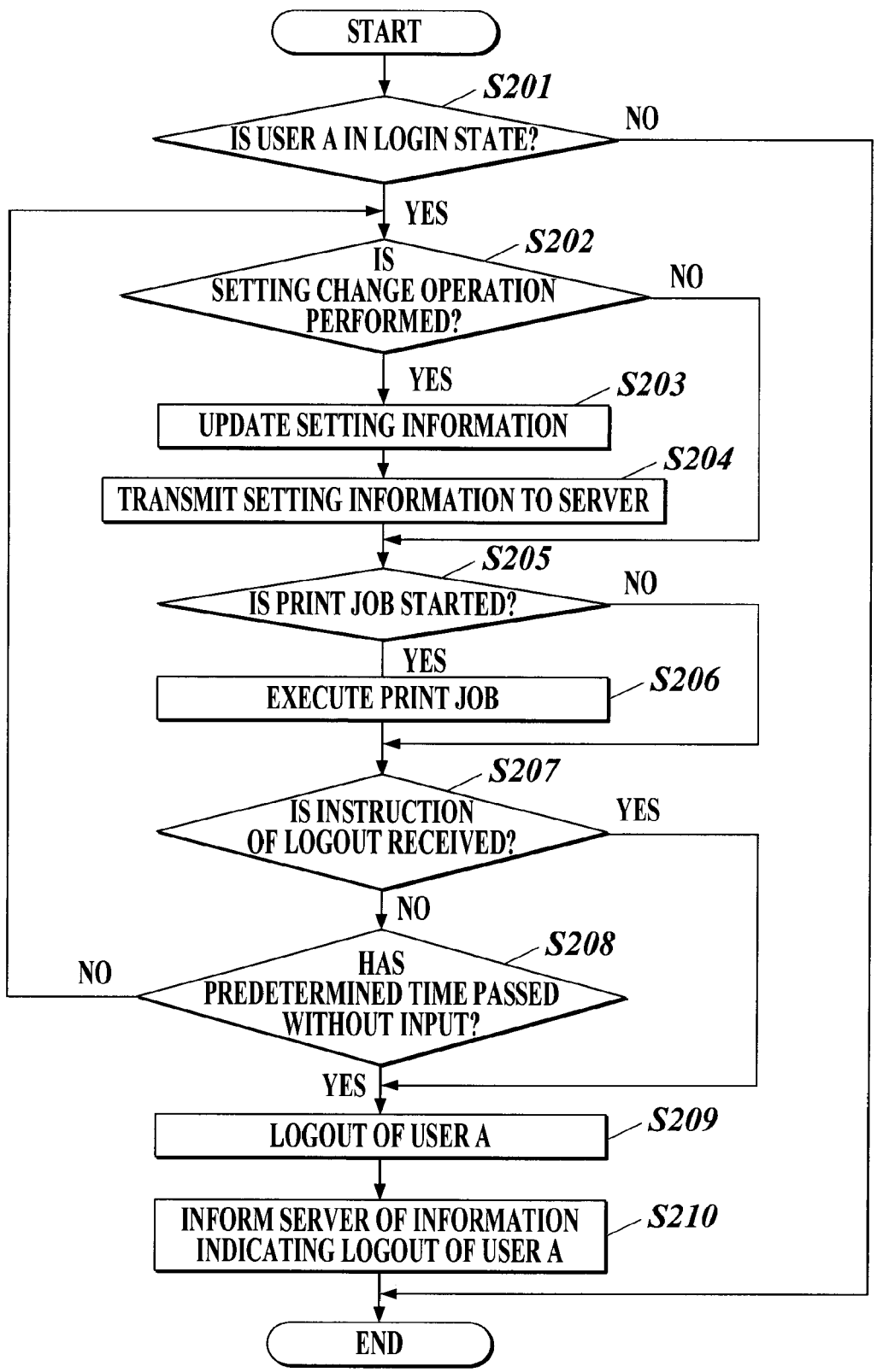

IMAGE FORMING SYSTEM AND IMAGE FORMING DEVICE FOR PERFORMING CONTROL IN ACCORDANCE WITH USER AUTHENTICATION INFORMATION

CROSS-REFERENCE TO RELATED APPLICATIONS

This is a Divisional of U.S. application Ser. No. 13/487,913, filed Jun. 4, 2012, which is based upon and claims the benefit of priority from prior Japanese Patent Application No. 2011-125902, filed Jun. 6, 2011, and Japanese Patent Application No. 2011-125903, filed Jun. 6, 2011, the entire contents of all of which are incorporated herein by reference.

BACKGROUND

1. Field of the Invention

The present invention relates to an image forming system and an image forming device.

2. Description of Related Art

Nowadays, a plurality of image forming devices are connected to one another via a network so as to be properly used depending on installation sites, functions, and properties such as output speed of the image forming devices. In some cases, a login operation is required before use of an image forming device to permit only a registered user to use the image forming device.

For example, an accounting management apparatus has been proposed for appropriate accounting control in the case of concurrent login of one user to a plurality of image forming devices (see Japanese Unexamined Patent Application Publication No. 2008-176631).

In addition, a print job authentication apparatus has been proposed, which transfers a print job to a proxy printer if an original printer receiving the print job is unavailable due to failure or other reasons and outputs the print job, and informs a user of such a state (see Japanese Unexamined Patent Application Publication No. 2005-327123).

In addition, an image-forming-device network system has been proposed, which can select data encryption in the transfer of image information of a document read by any one of a plurality of image forming devices to another one (see Japanese Unexamined Patent Application Publication No. 2005-079681).

In addition, an image processing system has been proposed, which searches for an available image forming device if an original image forming device is unavailable due to failure or its insufficient capacity, and allows the found image forming device to operate as a proxy (see Japanese Unexamined Patent Application Publication No. 2002-135508).

If a user logs into an image forming device and then to another image forming device without logout of the former image forming device and leaves the image forming device, another user can use the former image forming device. This disadvantageously eliminates the effect of exclusive permission to registered users, leading to a security problem. In addition, unnecessary login of an off-site user to an image forming device inconveniently disables login of another user to the image forming device, thus inhibiting proper use of the image forming device.

Even if a user logs into a certain image forming device and starts setting to execute a job, the image forming device sometimes does not have desired functions such as a double-sided printing function and a stapling function. In such a case, the user must move to another image-forming device having these functions and requires troublesome reset.

SUMMARY

The present invention has been made in consideration of the above problems, and it is one of main objects to improve the security of the system. Another object of the present invention is to improve the operability in setting of conditions of an image forming device.

In order to achieve at least one of the above-described objects, according to an aspect of the present invention, there is provided an image forming system including:

a plurality of image forming devices connected in data communication with each other via a network, each of the image forming devices including:
    a storage unit that stores first authentication information corresponding to a user permitted to log into a relevant image forming device,
    an operational unit for input of second authentication information, and
    a controller that permits logging into the relevant image forming device if the second authentication information received from the operational unit matches the first authentication information stored in the storage unit, wherein if one user logs into a first image forming device among the image forming devices, a controller of the first image forming device checks for the existence of a second image forming device into which the user has logged, and if the controller of the first image forming device determines the second image forming device into which the user has logged, the controller transmits a logout instruction of the user to the second image forming device.

Preferably, in the image forming system, the controller of the first image forming device puts a query on a login state of the user to all other image forming devices among the image forming devices, and checks for the existence of the second image forming device into which the user has logged, on the basis of a result of the query.

Preferably, in the image forming system, the controller of the second image forming device determines whether the second image forming device is executing a job for the user in response to a logout instruction of the user from the first image forming device, and if the second image forming device is executing the job for the user, the controller performs a logout operation for the user after completion of the job.

Preferably, in the image forming system, the controller of the second image forming device determines whether the second image forming device is in a predetermined function setting state in response to a logout instruction of the user from the first image forming device, and if the second image forming device is in the predetermined function setting state, the controller maintains the login state.

Preferably, in the image forming system, the predetermined function setting state is different from a state set by default.

Preferably, in the image forming system, the predetermined function setting state includes a predetermined number or more of setting items having modifications from default values.

Preferably, in the image forming system, the predetermined function setting state includes a predetermined setting item having a modification from a default value.

According to another aspect of the present invention, there is provided an image forming system including:

a plurality of image forming devices connected in data communication with each other via a network,
each of the image forming devices including:
a first storage unit that stores first authentication information corresponding to a user permitted to log into a relevant image forming device,
a second storage unit that stores setting information of the relevant image forming device,
an operational unit for input of second authentication information, and
a controller that permits logging into the relevant image forming device if the second authentication information received from the operational unit matches the first authentication information stored in the first storage unit,
wherein if one user logs into a first image forming device among the image forming devices, a controller of the first image forming device checks for the existence of a second image forming device into which the user has logged, and
if the controller determines the second image forming device into which the user has logged, the controller acquires the setting information stored in the second storage unit of the second image forming device from the second image forming device, and sets the setting information of the second image forming device in the first image forming device.

Preferably, in the image forming system,
the controller of the first image forming device puts a query on a login state of the user to all other image forming devices among the image forming devices, and checks for the existence of the second image forming device into which the user has logged on the basis of a result of the query.

Preferably, in the image forming system,
if a certain setting content in the setting information of the second image forming device is not settable in the first image forming device, the controller of the first image forming device informs the second image forming device of such a state, and changes such a non-settable content to a content settable in the first image forming device, and resets the new content.

Preferably, in the image forming system,
if the second image forming device has setting information different from that set by default, the controller of the first image forming device sets the setting information of the second image forming device in the first image forming device.

Preferably, in the image forming system,
if the second image forming device has setting information having a predetermined number or more of setting items having values different from default values, the controller of the first image forming device sets the setting information of the second image forming device in the first image forming device.

Preferably, in the image forming system,
if the second image forming device has setting information having a predetermined setting item having a value different from a default value, the controller of the first image forming device sets the setting information of the second image forming device in the first image forming device.

Preferably, in the image forming system,
the controller of the first image forming device sets the setting information of the second image forming device in the first image forming device, and then transmits a logout instruction of the user to the second image forming device.

BRIEF DESCRIPTION OF THE DRAWINGS

The present invention will become more fully understood from the detailed description given hereinbelow and the appended drawings, and thus are not intended to define the limits of the present invention, and wherein;

FIG. 8 is a schematic illustration of an expanded consecutive shooting function;

FIG. 23 illustrates an exemplary setting reflection confirmation menu including reflection-impracticable-setting change information;

FIG. 24 illustrates an exemplary top setting menu;

FIG. 33 is a flowchart illustrating a process executed by another multi-functional peripheral of the fourth embodiment.

DETAILED DESCRIPTION OF PREFERRED EMBODIMENTS

First Embodiment

A first embodiment of an image forming system according to the present invention will now be described.

Figure 1:
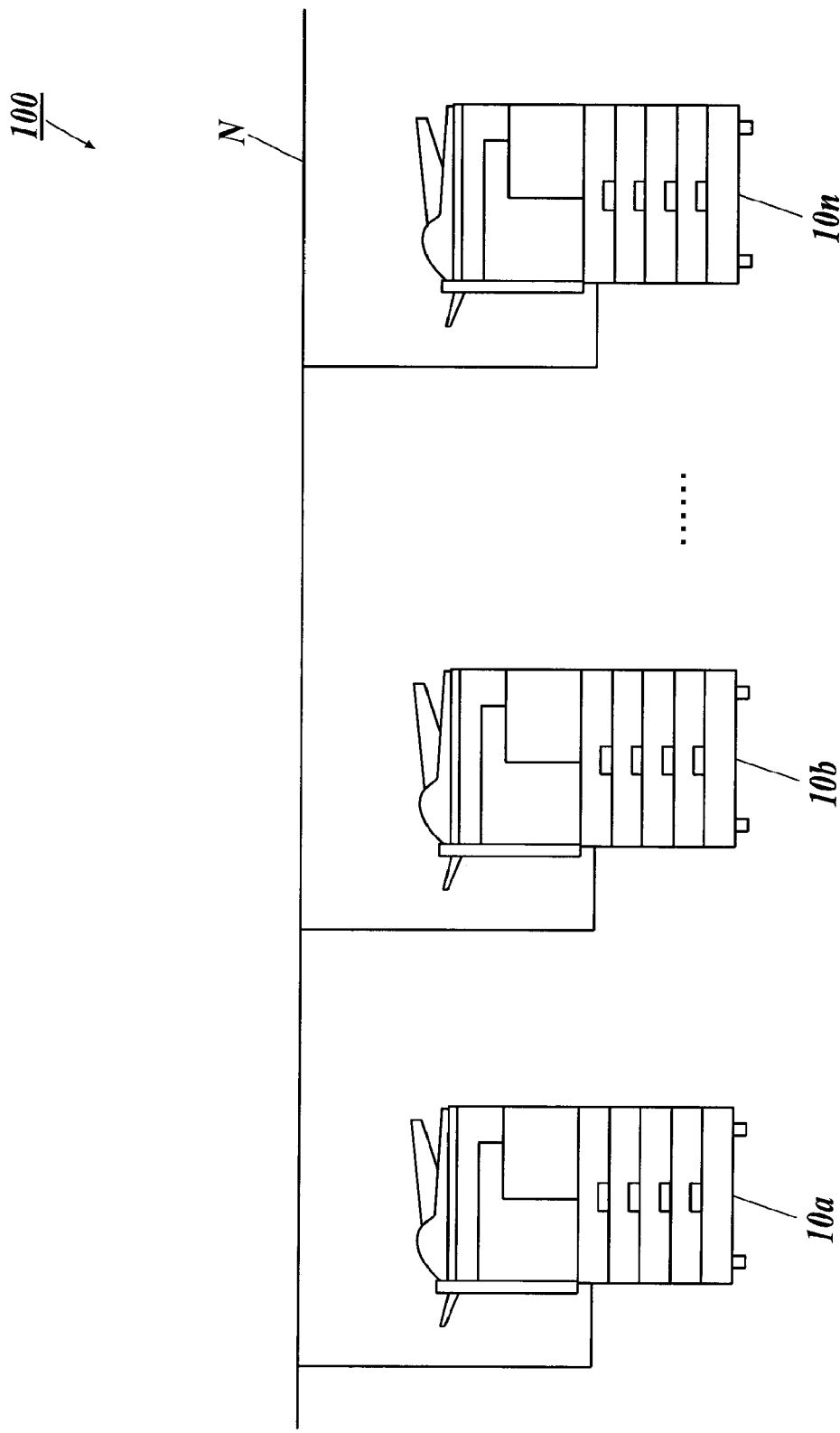
FIG. 1 is a system configuration diagram of an image forming system of a first embodiment.

FIG. 1 illustrates a system configuration of an image forming system 100 of the first embodiment. As shown in FIG. 1, the image-forming system 100 includes multi-functional peripherals (MFP) 10a, 10b, . . . , 10n as image forming devices connected in data communication with each other through a network N.

The multi-functional peripherals 10a, 10b, . . . , 10n are each a multiple-purpose image-forming device including a print function, a copy function, a scanner function, and a facsimile function.

Figure 2:
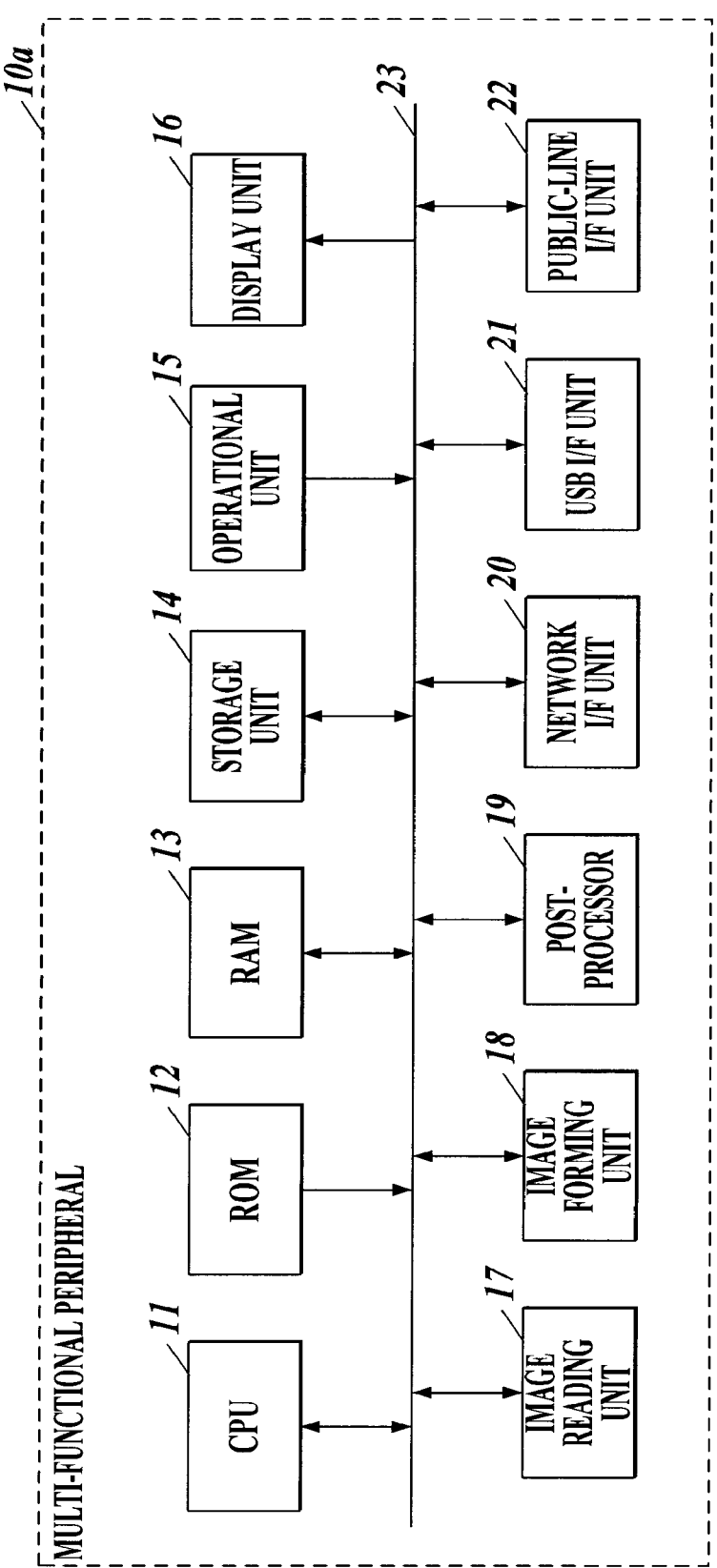
FIG. 2 is a block diagram illustrating a functional configuration of a multi-functional peripheral.

FIG. 2 illustrates a functional configuration of the multi-functional peripheral 10a. As shown in FIG. 2, the multi-functional peripheral 10a includes a central processing unit (CPU) 11 as a controller, a read only memory (ROM) 12, a random access memory (RAM) 13, a storage unit 14, an operational unit 15, a display unit 16, an image reading unit 17, an image forming unit 18, a post-processor 19, a network interface (I/F) unit 20, a universal serial bus (USB) I/F unit 21, and a public line I/F unit 22, which are connected to one another through a bus 23.

The CPU 11 generally controls operations of these components of the multi-functional peripheral 10a. The CPU 11 reads various processing programs stored in the ROM 12 and expands each program in the RAM 13, and generally controls the printer function, the copy function, the scanner function, and the facsimile function in cooperation with the programs.

The ROM 12 includes a nonvolatile semiconductor memory, and stores the various processing programs, and parameters and files necessary for execution of the programs.

The RAM 13 defines a work area for temporarily storing the various processing programs to be executed by the CPU 11 and data for the programs.

For example, the RAM 13 stores data of an unexecuted job in association with a user instructing execution of the job. The job refers to a series of operations for image formation, for example, refers to a series of operations for image formation of a document of predetermined pages in the case of copy of the document, and refers to a series of operations for image formation of a plurality of number of copies in the case of image formation of the plurality of number of copies.

The storage unit 14 includes a storage device such as a nonvolatile semiconductor memory or a hard disc, and stores data for various types of processing, for example.

The storage unit 14 stores first authentication information (a user name and a password) corresponding to a registered user that is beforehand permitted to log into the multi-functional peripheral 10a.

In addition, the storage unit 14 stores function mode information indicating a currently specified function mode (a copy mode, a scan mode, or a fax mode) in the multi-functional peripheral 10a.

In addition, the storage unit 14 stores setting information in the multi-functional peripheral 10a. The setting information includes a set value and information indicating modifications from default values for individual setting items. The setting information further includes various types of information set in the multi-functional peripheral 10a, such as an image forming condition including a paper type, the number of copies, a magnification, double- or single-sided printing, and aggregation, and post-processing conditions including sorting, stapling, and punching.

In addition, the storage unit 14 stores transmission destination information in the scan mode and in the FAX mode for individual registered user.

Figure 3:
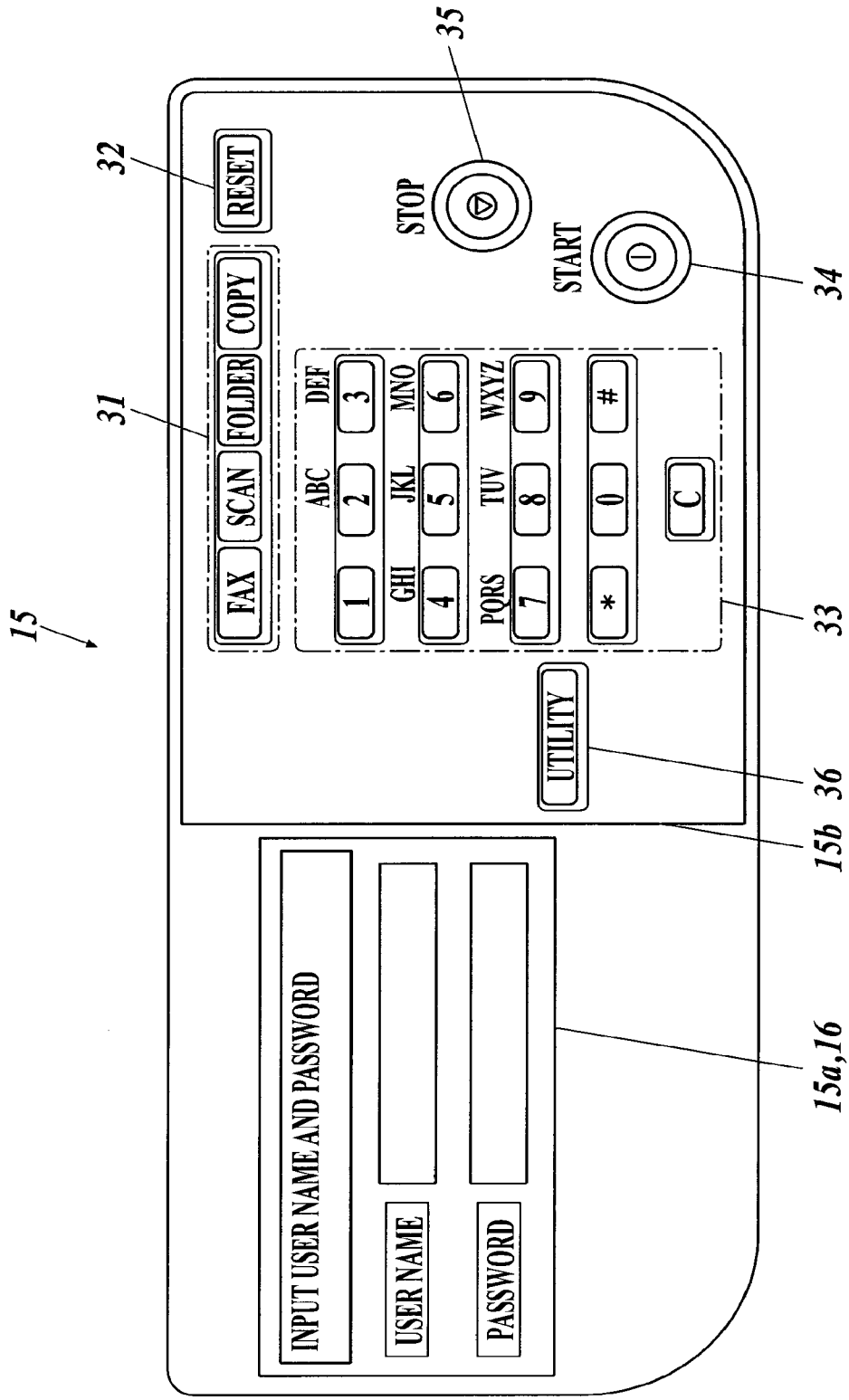
FIG. 3 illustrates a configuration of an operational unit.

The operational unit 15 is a functional unit receiving an operation by a user, and includes, as shown in FIG. 3, a pressure-sensitive touch panel 15a including transparent electrodes arranged in a matrix on a display of the display unit 16, and hard keys 15b. The operational unit 15 detects a position on the touch panel 15a in abutment with a fingertip of a user or a touch pen, and sends the corresponding positional signal to the CPU 11. In addition, the operational unit 15 sends a press signal corresponding to a pressed hard key 15b to the CPU 11. For example, the operational unit 15 is operated to input second authentication information (a user name and a password).

The hard keys 15b include mode switching keys 31, a reset key 32, a numerical keypad 33, a start key 34, a stop key 35, and a utility key 36.

The mode switching keys 31 are used to switch among the modes of FAX, scan, folder, and copy. The folder mode refers to a mode of selecting image data stored in a predetermined folder in the storage unit 14 for image formation.

The reset key 32 is used to return the setting to default values.

The numerical keypad 33 is used to input numerical values and characters.

The start key 34 is used to start operations of copy, print, and transmission, and other operations.

The stop key 35 is used to stop an operating state.

The utility key 36 is used to set or adjust the system of the multi-functional peripheral 10a itself.

The display unit 16 includes a liquid crystal display (LCD) or an organic electro luminescence (EL) display, and displays various operational menus and processed results in accordance with display signals received from the CPU 11.

The image reading unit 17 includes an image reader (IR) that scans a document with light, reads an image of the document through photoelectric conversion with a charge-coupled-device (CCD) image sensor, and forms image data of red (R), green (G), and blue (B), and an automatic document feeder (ADF) for automatic transfer of documents.

The image forming unit 18 forms an image on paper on the basis of image data generated by the image reading unit 17, image data received by the network I/F unit 20, and FAX image data received by the public line I/F unit 22. For example, the image forming unit 18 forms electrophotographic images, and includes a photoreceptor drum, a charger for charge of the photoreceptor drum, an exposure section that scans a surface of the photoreceptor drum with light on the basis of image data, a development section that applies toner on the photoreceptor drum, a transfer section that transfers a toner image defined on the photoreceptor drum to paper for printing, and a fixer that fixes the toner image defined on the paper.

The post-processor 19 performs post-processing such as sorting, stapling, and punching to the paper having the defined image.

The network I/F unit 20 includes a network interface card (NIC), and transmits/receives data to/from external devices through the network N.

The USB I/F unit 21 is used to connect the multi-functional peripheral 10a to an external device having a USB interface.

The public line I/F unit 22 is used to connect the multi-functional peripheral 10a to a public line for transmission/reception of FAX. The public line I/F unit 22 includes a modem that converts received analog signals to digital signals that are processable in the multi-functional peripheral 10a, and a TEL response module having an automatic voice response function.

The CPU 11 permits logging into the multi-functional peripheral 10a if the second authentication information (a combination of a user name and a password) received from the operational unit 15 matches the first authentication information (a combination of a user name and a password) stored in the storage unit 14.

After one user logs into the multi-functional peripheral 10a, the CPU 11 checks for the existence of another multi-functional peripheral into which the user has logged. In detail, the CPU 11 puts a query on login of one user to all other ones among the multi-functional peripherals 10a, 10b, . . . , 10n, and checks for the existence of another multi-functional peripheral into which the user has logged on the basis of the result of the query.

If the CPU 11 determines the existence of another multi-functional peripheral into which one user has logged, the CPU 11 transmits a logout instruction of the user to this multi-functional peripheral through the network I/F unit 20.

If the CPU 11 receives a logout instruction of one user from one multi-functional peripheral through the network I/F unit 20, the CPU 11 checks for the execution state of a job for the user. If the CPU 11 determines execution of the job, the CPU 11 performs the logout operation for the user after the job is completed.

In response to a logout instruction of one user from one multi-functional peripheral through the network I/F unit 20, the CPU 11 determines whether the multi-functional peripheral 10a (the original peripheral) is set in a predetermined function state. If the CPU 11 determines the multi-functional peripheral 10a set in the predetermined function state, the CPU 11 maintains the login state of the user. For example, if the multi-functional peripheral 10a is in a state different from a state set by default, the CPU 11 maintains the login state.

Other multi-functional peripherals 10b, . . . , 10n each have the same configuration as that of the multi-functional peripheral 10a; hence, the same numerals are used therein and duplicated description is omitted.

An operation of the image forming system 100 will now be described.

In a possible situation, a user A intends to copy a document by the multi-functional peripheral 10a in view of the installed site or desired functions and/or properties, but the multi-functional peripheral 10a is being used by a user B. In such a state, the user A is inevitably about to log into another multi-functional peripheral 10b for the copy. If the user B finishes the use of the multi-functional peripheral 10a before execution of the relevant copy by the user A, the user A moves to the vacated multi-functional peripheral 10a. In the following description, the user A re-logs into the multi-functional peripheral 10a.

Figure 4:
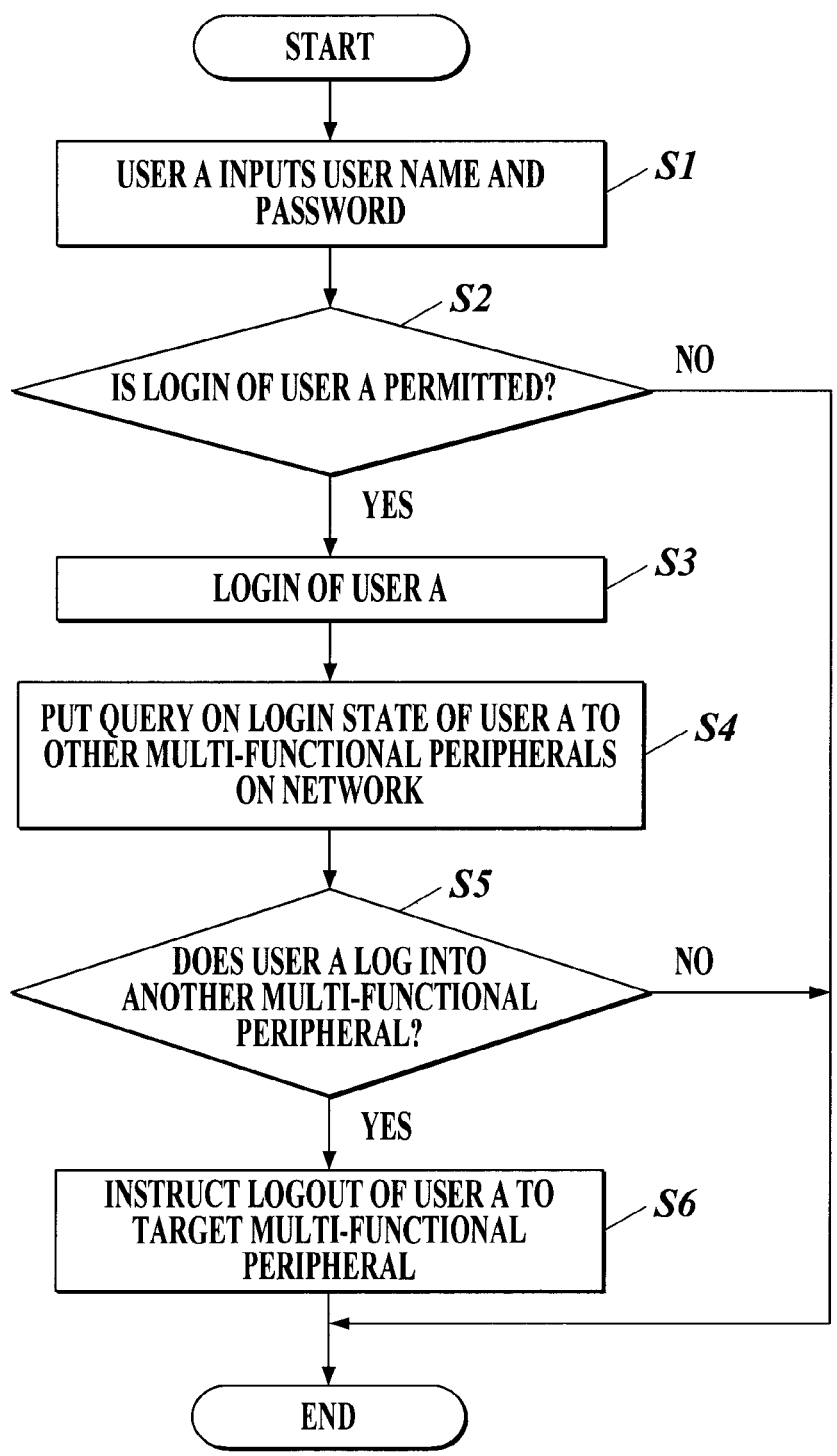
FIG. 4 is a flowchart illustrating a login process executed by the multi-functional peripheral of the first embodiment.

FIG. 4 is a flowchart illustrating a login process executed by the multi-functional peripheral 10a. This process is achieved by software processing through cooperation of the CPU 11 with a program stored in the ROM 12.

A user name and a password (the second authentication information) of the user A are input through an operation from the operational unit 15 by the user (step S1). The CPU 11 then checks for the permission state of login of the user A to the multi-functional peripheral 10a (step S2). In detail, the CPU 11 checks for a matched state between the second authentication information received from the operational unit 15 and the first authentication information stored in the storage unit 14.

If the login of the user A to the multi-functional peripheral 10a is permitted (step S2: YES), namely, if the second authentication information received from the operational unit 15 matches the first authentication information stored in the storage unit 14, the CPU 11 permits the user A to log into the multi-functional peripheral 10a (step S3).

The CPU 11 then puts a query on a login state of the user A to all the other multi-functional peripherals 10b, . . . , 10n on the network N through the network I/F unit 20 (step S4). The CPU 11 then receives information indicating the login state of the user A from the multi-functional peripherals 10b, . . . , 10n through the network I/F unit 20.

The CPU 11 then checks for the login state of the user A to each of the multi-functional peripherals 10b, . . . , 10n on the basis of the result of the query in step S4 (step S5). If the user A logs into one of the multi-functional peripherals 10b, . . . , 10n (step S5; YES), the CPU 11 transmits a logout instruction of the user A to the multi-functional peripheral into which the user A logs (hereinafter, referred to as target multi-functional peripheral) through the network I/F unit 20 (step S6).

If the login of the user A to the multi-functional peripheral 10a is not permitted in step S2 (step S2: NO), or if the user A does not log into any of the other multi-functional peripherals 10b, . . . , 10n in step S5 (step S5; NO), or after step S6 is completed, the login process is finished.

Figure 5:
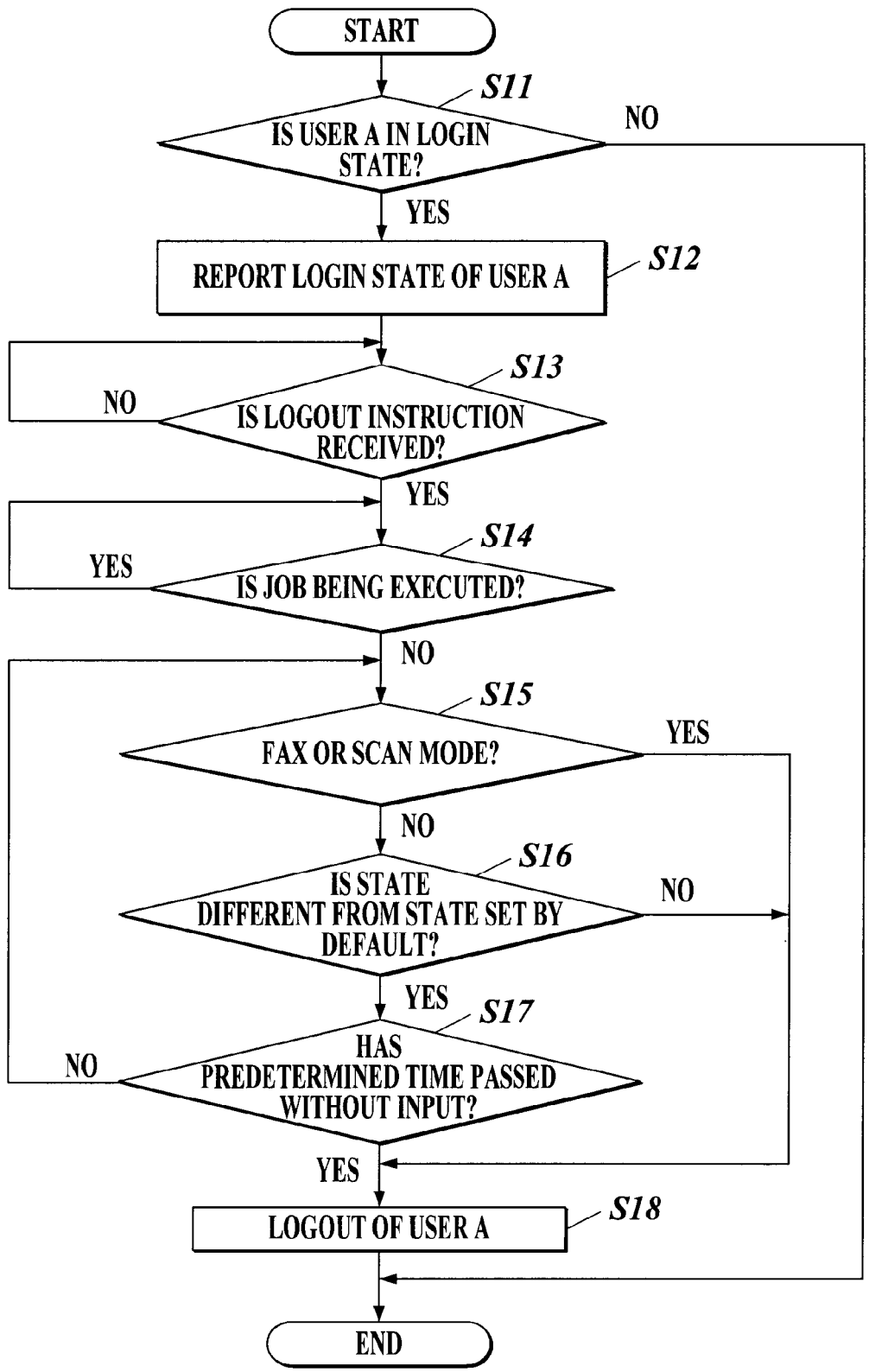
FIG. 5 is a flowchart illustrating a logout process executed by the multi-functional peripheral of the first embodiment.

FIG. 5 is a flowchart illustrating a logout process executed by the multi-functional peripheral 10b among the multi-functional peripherals 10b, . . . , 10n other than the multi-functional peripheral 10a. This process, which is executed after a query on a login state of the user A is put by the multi-functional peripheral 10a, is achieved by software processing through cooperation of the CPU 11 with a program stored in the ROM 12.

The CPU 11 checks for the login state of the user A to the multi-functional peripheral 10b (step S11). If the CPU 11 does not determine the login state of the user A (step S11; NO), the process is finished.

If the CPU 11 determines the login state of the user A in step S11 (step S11; YES), the CPU 11 informs the multi-functional peripheral 10a of such a login state of the user A through the network I/F unit 20 (step S12).

The CPU 11 then determines whether the multi-functional peripheral 10b receives a logout instruction of the user A from the multi-functional peripheral 10a through the network I/F unit 20 (step S13). If no information is received from the operational unit 15 for a predetermined time while the multi-functional peripheral 10b does not receive the logout instruction of the user A, the CPU 11 performs the logout operation for the user A.

If the multi-functional peripheral 10b receives the logout instruction of the user A from the multi-functional peripheral 10a (step S13; YES), the CPU 11 determines whether any job for the user A is being executed (step S14). If a job for the user A is being executed (step S14; YES), the process is into a standby mode until the job is completed.

If any job for the user A is not executed in step S14 (step S14; NO), the CPU 11 reads the function mode information stored in the storage unit 14 to determine whether the multi-functional peripheral 10b is in the FAX or scan mode or not (step S15). If the multi-functional peripheral 10b is in the FAX or scan mode (step S15; YES), the CPU 11 performs the logout operation for the user A (step S18).

If the multi-functional peripheral 10b is not in the FAX or scan mode in step S15 (step S15; NO), the CPU 11 maintains the login state. The CPU 11 then reads the setting information stored in the storage unit 14 to determine whether the multi-functional peripheral 10*b* is in a state different from a state set by default (step S16). In detail, if at least one setting item has a value different from the default value, the CPU 11 determines that the multi-functional peripheral 10*b* is in a state different from the state set by default. In contrast, if all the setting items have the default values, the CPU 11 determines that the multi-functional peripheral 10*b* is in the state set by default. If the multi-functional peripheral 10*b* is in the state set by default (step S16; NO), the CPU 11 performs the logout operation for the user A (step S18).

If the multi-functional peripheral 10*b* is in the state different from the state set by default in step S16 (step S16; YES), the CPU 11 maintains the login state. The CPU 11 then determines whether a predetermined time has passed without input from the operational unit 15 (step S17). If the predetermined time has not passed without input from the operational unit 15 (step S17; NO), the process returns to step S15.

If the predetermined time has passed without input from the operational unit 15 in step S17 (step S17; YES), the CPU 11 performs the logout operation for the user A (step S18).

This is the end of the logout process executed by the multi-functional peripheral 10*b*.

While the multi-functional peripheral 10*b* has been exemplified among the multi-functional peripherals 10*b*, . . . , 10*n* other than the multi-functional peripheral 10*a*, the other multi-functional peripherals also have similar functions.

As described above, according to the first embodiment, in a situation where a plurality of multi-functional peripherals 10*a*, 10*b*, . . . , 10*n* are connected to one another via a network N, if a user logs into a multi-functional peripheral and then logs into another multi-functional peripheral, the latter multi-functional peripheral transmits a logout instruction to the former multi-functional peripheral. This prevents the former multi-functional peripheral from being left in the login state, thus improving the security of the system.

In addition, the latter multi-functional peripheral puts a query to all the other multi-functional peripherals, and thus it can determine whether a user of the latter multi-functional peripheral has logged into another multi-functional peripheral.

If a user logs into a multi-functional peripheral while performing a job in another multi-functional peripheral, the user possibly desires to complete the job in the former multi-functional peripheral while using the latter multi-functional peripheral. Here, the user suddenly stops the job and logs out from the former multi-functional peripheral, which is disadvantageous for the user. According to the first embodiment, if the multi-functional peripheral receives the logout instruction while it is executing a job for a relevant user, a logout operation is performed after completion of the job, thus preventing logout of a job in progress.

In addition, if another multi-functional peripheral receives the logout instruction while being in a predetermined function setting state, the login state is maintained. This enables appropriate determination on logout depending on the state of this multi-functional peripheral. In detail, if another multi-functional peripheral is in a state different from a state set by default, the multi-functional peripheral is maintained in the login state; hence, if such a multi-functional peripheral is in a modified setting state, the modified setting state can be maintained.

If a multi-functional peripheral is left in the FAX or scan mode that has been selected, destination information may be leaked to another user. According to the first embodiment, if another multi-functional peripheral receives a logout instruction while being in the FAX or scan mode, a logout operation is immediately performed in this multi-functional peripheral, preventing leakage of the destination information.

[Modification 1 of First Embodiment]

Modification 1 of the first embodiment will now be described.

In the first embodiment, if a first multi-functional peripheral sends a logout instruction of one user to a second multi-functional peripheral being in a login state, and if the second multi-functional peripheral is in a state different from a state set by default, the login state is maintained. In Modification 1, if a first multi-functional peripheral sends a logout instruction of one user to a second multi-functional peripheral in a login state, and if the second multi-functional peripheral has a predetermined number, for example, three, or More of setting items having modifications from default values, the login state is maintained. The predetermined number can be appropriately varied. The other configurations and processes are the same as in the first embodiment.

Figure 6:
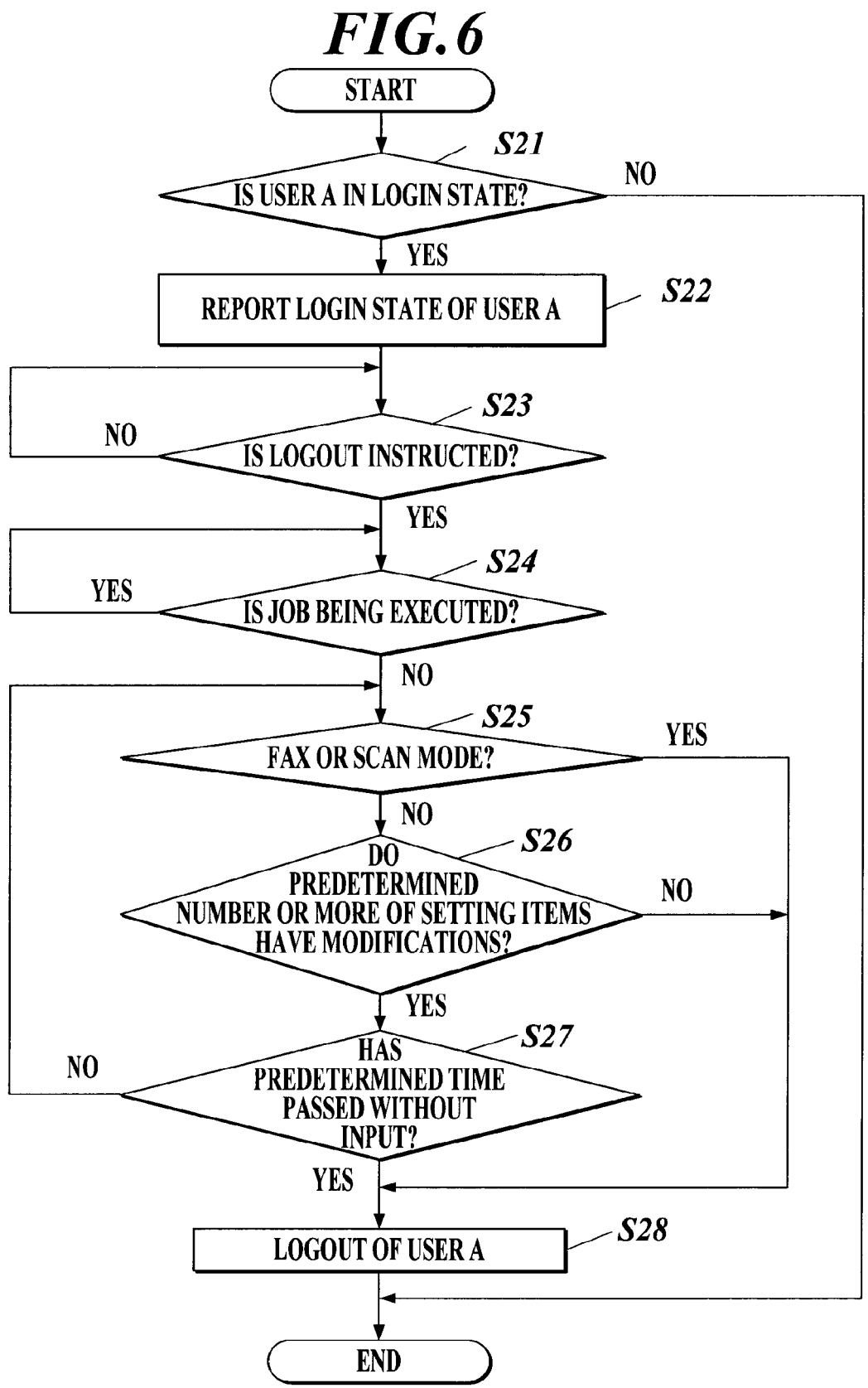
FIG. 6 is a flowchart illustrating a logout process in Modification 1 of the first embodiment.

FIG. 6 is a flowchart illustrating a logout process executed by a multi-functional peripheral (referred to as multi-functional peripheral 10*b*) receiving a query on a login state of a user A from another multi-functional peripheral (referred to as multi-functional peripheral 10*a*). This process is achieved by software processing through cooperation of the CPU 11 with a program stored in the ROM 12.

The process of steps S21 to S25 in FIG. 6 is the same as that of steps S11 to S15 in FIG. 5, and duplicated description is omitted.

If the multi-functional peripheral 10*b* is not in the FAX or scan mode in step S25 (step S25; NO), the CPU 11 reads the setting information stored in the storage unit 14 to check for the existence of modifications from default values for a predetermined number or more of setting items in the multi-functional peripheral 10*b* on the basis of information indicating the existence of modifications from default values for individual setting items (step S26). If the predetermined number or more of setting items each have no modification from a default value (step S26; NO), the CPU 11 performs the logout operation for the user A (step S28).

If the predetermined number or more of setting items each have a modification from a default value in step S26 (step S26; YES), the CPU 11 maintains the login state. The CPU 11 then determines whether a predetermined time has passed without input from the operational unit 15 (step S27). If the predetermined time has not passed without input from the operational unit 15 (step S27; NO), the process returns to step S25.

If the predetermined time has passed without input from the operational unit 15 in step S27 (step S27; YES), the CPU 11 performs the logout operation for the user A (step S28).

This is the end of the logout process in Modification 1.

As described above, according to Modification 1 of the first embodiment, which has advantageous effects similar to those in the first embodiment, if the second multi-functional peripheral receiving the logout instruction has a predetermined number or more of setting items having modifications from default values, the login state is maintained; hence, if the second multi-functional peripheral has a predetermined number or more of setting items having modifications, such a modified setting state can be maintained.

[Modification 2 of First Embodiment]

Modification 2 of the first embodiment will now be described.

In the first embodiment, if a first multi-functional peripheral sends a logout instruction of one user to a second multi-functional peripheral, and if the second multi-functional peripheral is in a state different from a state set by default, the login state is maintained. In Modification 2, if a first multi-functional peripheral sends a logout instruction of one user to a second multi-functional peripheral, and if the second multi-functional peripheral has a predetermined setting item having a modification from the default value, the login state is maintained. The predetermined setting item can be appropriately varied. The other configurations and processes are the same as in the first embodiment.

Figure 7:
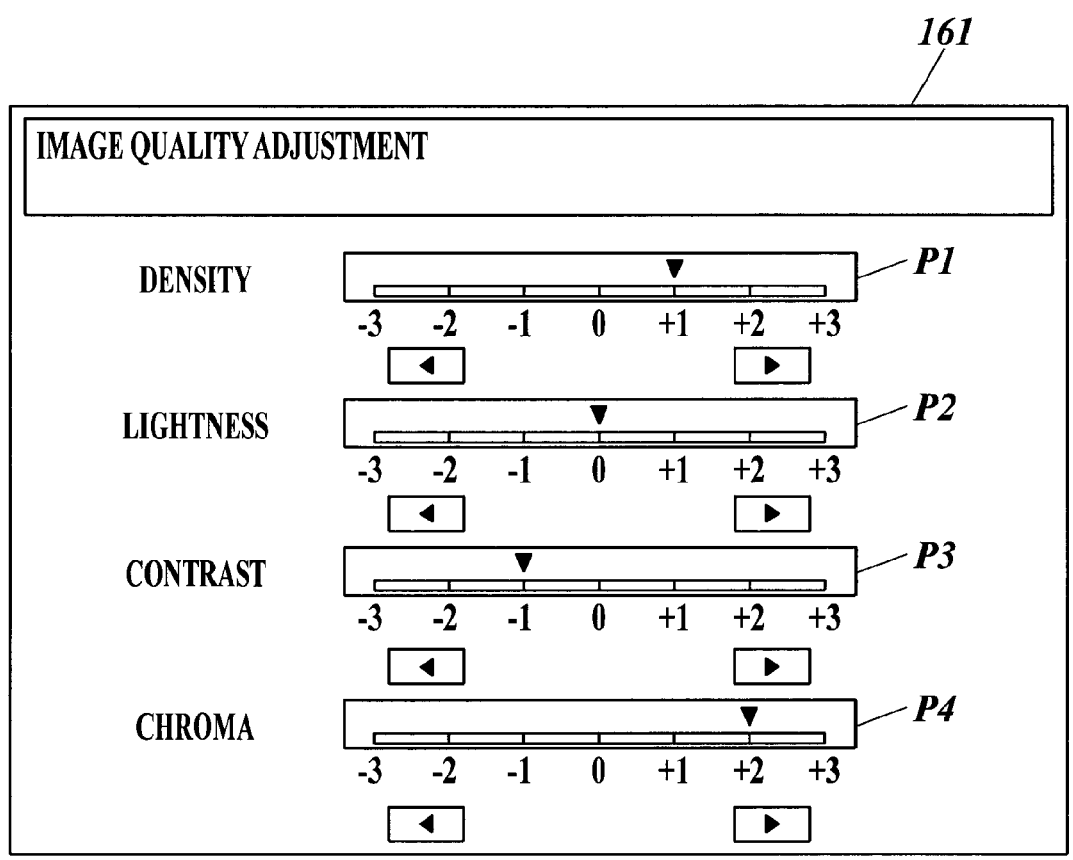
FIG. 7 illustrates an exemplary image adjustment menu.

For example, if the second multi-functional peripheral into which one user has logged has a setting item on adjustment of image quality that is modified from image quality set by default, the user does not log out from the second multi-functional peripheral so as to maximize the image quality being finely adjusted according to a requirement of the user. FIG. 7 illustrates an exemplary image-quality adjustment menu 161. The image-quality adjustment menu 161 includes a density setting region 21, a lightness setting region P2, a contrast setting region P3, and a chroma setting region P4. The density, lightness, contrast, and chroma in the setting regions P1 to P4 can be each increased or decreased stepwise with respect to a default value.

If a function defined by a combination of a plurality of setting items is set in the second multi-functional peripheral into which one user has logged, the user does not log out from the second multi-functional peripheral so as to maximize the set items. The function defined by a combination of a plurality of setting items includes expanded consecutive shooting.

As shown in FIG. 8, the expanded consecutive shooting refers to an enlarged photocopy function of enlarging an image in a document to a size over a paper size settable in the multi-functional peripheral, such as sizes A0 and B0. A document size and a finished size (size after enlarged photocopy) are specified before copy of a document, and then an image of the document is enlarged and copied on several sheets of paper in a segmented manner. Such segmented image copies are put together, resulting in an enlarged copy at a finish size. For example, an original image is segmented and copied on eight sheets of size-A3 paper in an enlarged manner, and the eight sheets are put together into a size-A0 poster.

Figure 9:
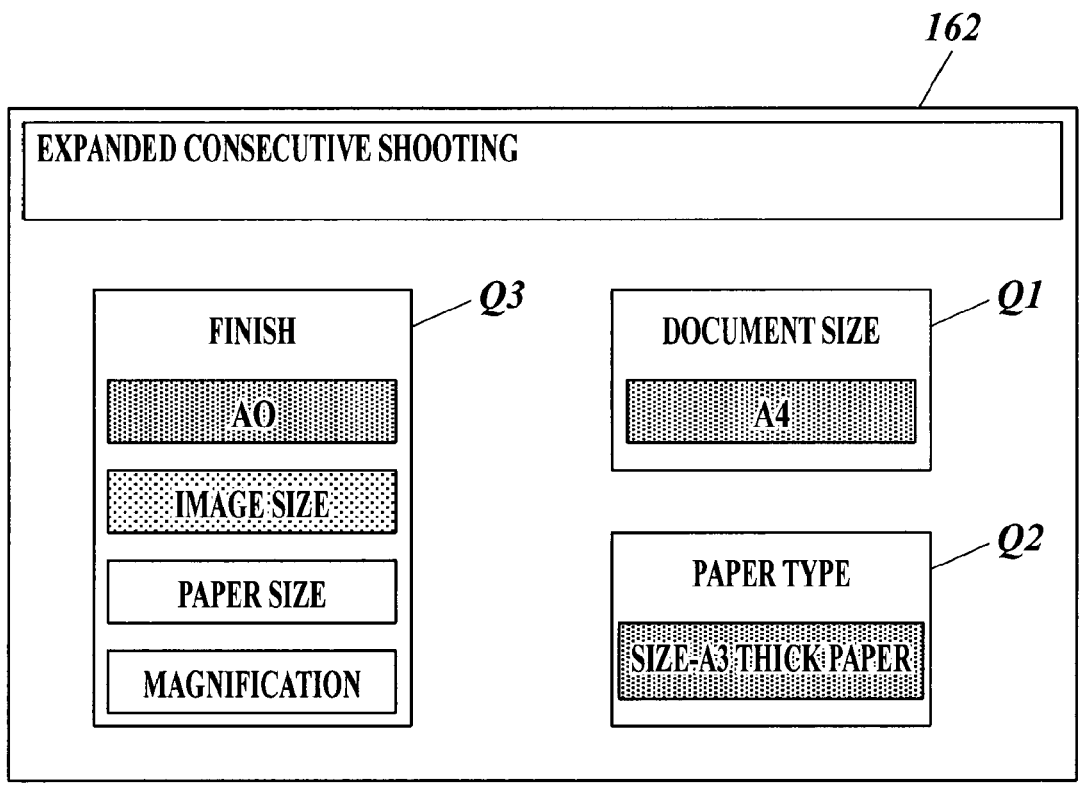
FIG. 9 illustrates an exemplary menu of setting expanded consecutive shooting.

FIG. 9 illustrates an exemplary expanded-consecutive-shooting setting menu 162. The expanded-consecutive-shooting setting menu 162 includes a document size setting region Q1, a paper setting region Q2, and a finish setting region Q3. The document size setting region Q1 is provided to set a document size. The paper setting region Q2 is provided to set a size and a type of paper. The finish setting region Q3 is provided to set a finish state of expanded consecutive shooting through specifying an image size, and a paper size or a magnification.

If the "finished image size" is specified, an image of a document size set in the document size setting region Q1 is enlarged (scaled up) into an image size set in the finish setting region Q3. For example, in the case where a document of size A3 (420 mm×297 mm) is scaled up into size B3 (514 mm×364 mm) with size-A3 paper, the document is magnified by 1.224 times (B3/A3), and four enlarged images are formed on four sheets of size-A3 paper, respectively.

If the "finished paper size" is specified, an image of a document size set in the document size setting region Q1 is enlarged (scaled up) into a paper size set in the finish setting region Q3. For example, in the case where a document image of letter size (279.4 mm×215.9 mm) is scaled up into size A2 (594 mm×420 mm) with size-A3 (420 mm×297 mm) paper, the image is enlarged at a certain magnification so as to be just fit on two sheets of size-A3 paper, namely, enlarged at a smaller magnification between a magnification in a long-side direction (594/279.4, or 1.414 times) and a magnification in a short-side direction (420/215.9, or 1.945 times).

If the "magnification" is specified, an image at a magnification set in the finish setting region Q3 is formed so as to be just fit on the paper set in the paper setting region Q2. For example, in the case where a document image of size A3 (420 mm×297 mm) is scaled up at a magnification of 2 times with size-A3 paper, the images are enlarged and formed into size A1 (840 mm×594 mm) defined by a combination of four sheets of size-A3 paper.

Figure 10:
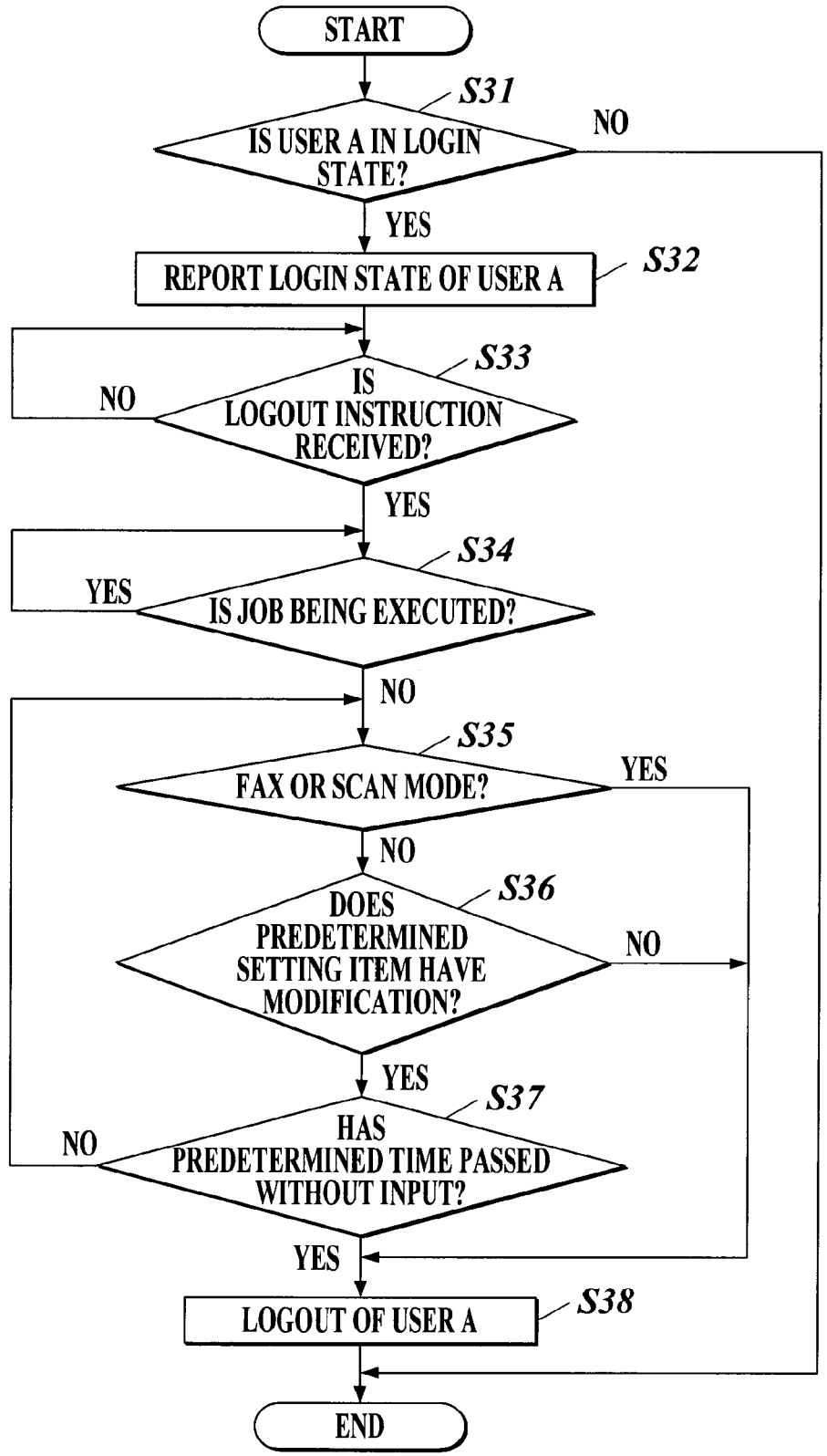
FIG. 10 is a flowchart illustrating a logout process in Modification 2 of the first embodiment.

FIG. 10 is a flowchart illustrating a logout process executed by a multi-functional peripheral (referred to as multi-functional peripheral 10b) receiving a query on a login state of a user A from another multi-functional peripheral (referred to as multi-functional peripheral 10a). This process is achieved by software processing through cooperation of the CPU 11 with a program stored in the ROM 12.

The process of steps S31 to S35 in FIG. 10 is the same as that of steps S11 to S15 in FIG. 5, and description of the process is omitted.

If the multi-functional peripheral 10b is not in the FAX or scan mode in step S35 (step S35; NO), the CPU 11 reads the setting information stored in the storage unit 14 to check for the existence of a modification from a default value for a predetermined setting item in the multi-functional peripheral 10b on the basis of the information indicating the existence of modifications from default values for individual setting items (step S36). For example, the CPU 11 checks for the existence of a modification from a default value for a setting item on adjustment of image quality, and for a setting item such as expanded consecutive shooting defined by a combination of a plurality of setting items. If the predetermined setting item has no modification from a default value (step S36; NO), the CPU 11 performs the logout operation for the user A (step S38).

If the predetermined setting item has a modification from the default value in step S36 (step S36; YES), the CPU 11 maintains the login state. The CPU 11 then determines whether a predetermined time has passed without input from the operational unit 15 (step S37). If the predetermined time has not passed without input from the operational unit 15 (step S37; NO), the process returns to step S35.

If the predetermined time has passed without input from the operational unit 15 in step S37 (step S37; YES), the CPU 11 performs the logout operation for the user A (step S38).

This is the end of the logout process in Modification 2.

As described above, according to Modification 2 of the first embodiment, which has advantageous effects similar to those in the first embodiment, if the second multi-functional peripheral receiving the logout instruction has a predetermined setting item having a modification from a default value, the login state is maintained; hence, if the second multi-functional peripheral has a predetermined setting item having a modification, such a modified setting state can be maintained.

Second Embodiment

A second embodiment of the present invention will now be described.

Figure 11:
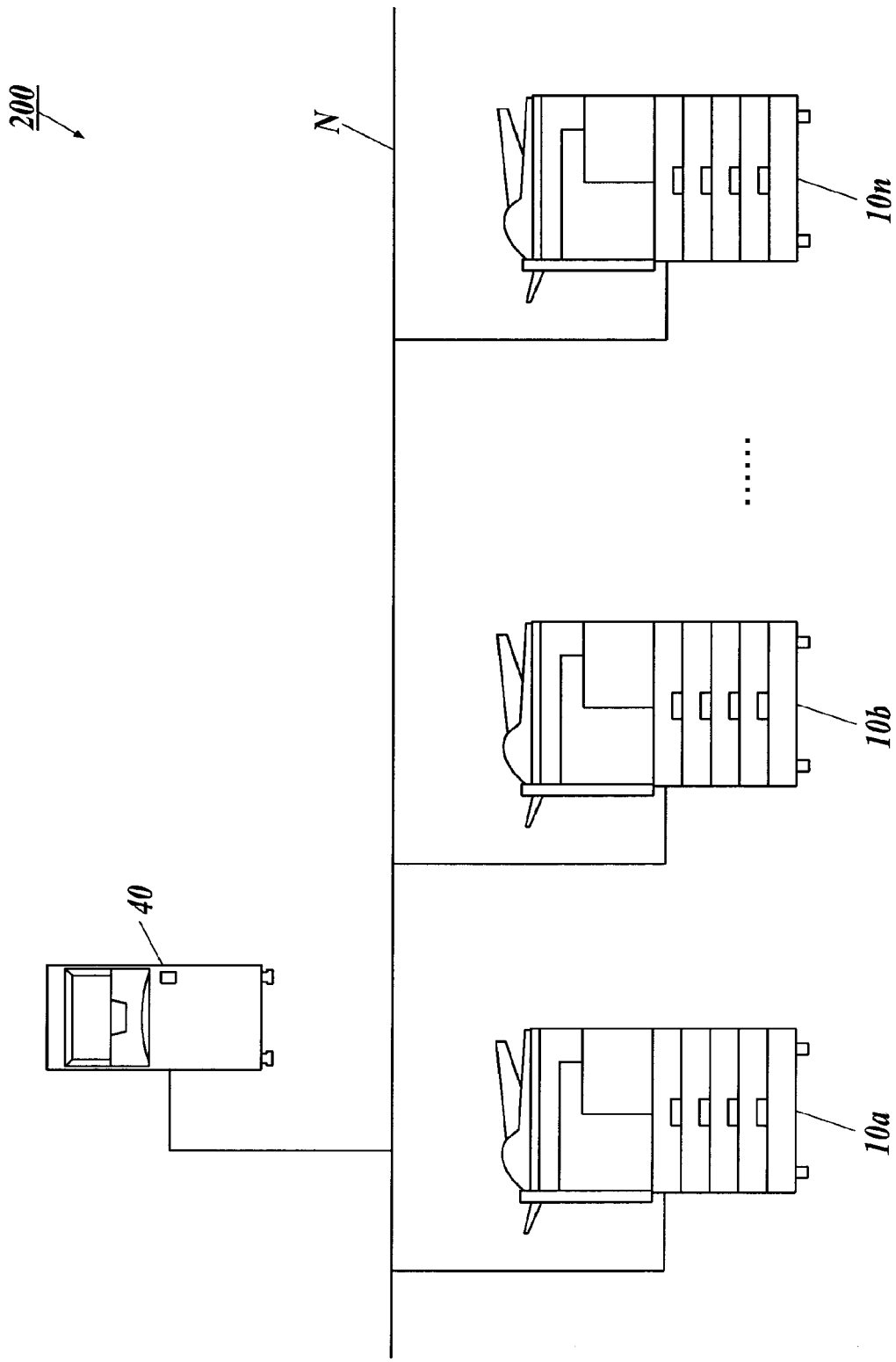
FIG. 11 is a system configuration diagram of an image forming system of a second embodiment.

FIG. 11 illustrates a system configuration of an image forming system 200 of the second embodiment. As shown in FIG. 11, the image-forming system 200 includes multi-functional peripherals 10a, 10b, . . . , 10n as image forming devices and a server 40 connected in data communication with each other through a network N.

The multi-functional peripherals 10a, 10b, . . . , 10n each have the same configuration as that in the first embodiment except that the server 40 controls the first authentication information, and FIG. 2 is to be referred to omit illustration and description of the configuration. A configuration and a process inherent in the second embodiment will now be described.

A CPU 11 of the multi-functional peripheral 10a as a second controller transmits second authentication information received from the operational unit 15 to the server 40 through a network I/F unit 20.

The CPU 11 of the multi-functional peripheral 10a checks for permission of logging into the multi-functional peripheral 10a on the basis of the authentication result received from the server 40 through the network I/F unit 20.

If a user logs in/out to/from the multi-functional peripheral 10a, the CPU 11 of the multi-functional peripheral 10a transmits the information indicating login/logout of the user to/from the multi-functional peripheral 10a to the server 40 through the network I/F unit 20.

If the CPU 11 of the multi-functional peripheral 10a receives a logout instruction of one user from the server 40 through the network I/F unit 20, the CPU 11 checks for an execution state of a job for the user. While the job is being executed, the CPU 11 suspends the logout operation for the user until the job is completed.

If the CPU 11 of the multi-functional peripheral 10a receives a logout instruction of one user from the server 40 through the network I/F unit 20, the CPU 11 determines whether the multi-functional peripheral 10a (the original peripheral) is set in a predetermined function state. If the multi-functional peripheral 10a is set in the predetermined function state, the CPU 11 maintains the login state. For example, if the multi-functional peripheral 10a is in a state different from a state set by default, the CPU 11 maintains the login state.

Other multi-functional peripherals 10b, ..., 10n each have the same configuration as that of the multi-functional peripheral 10a; hence, the same numerals are used therein and duplicated description is omitted.

The server 40 includes a typical personal computer (PC).

Figure 12:
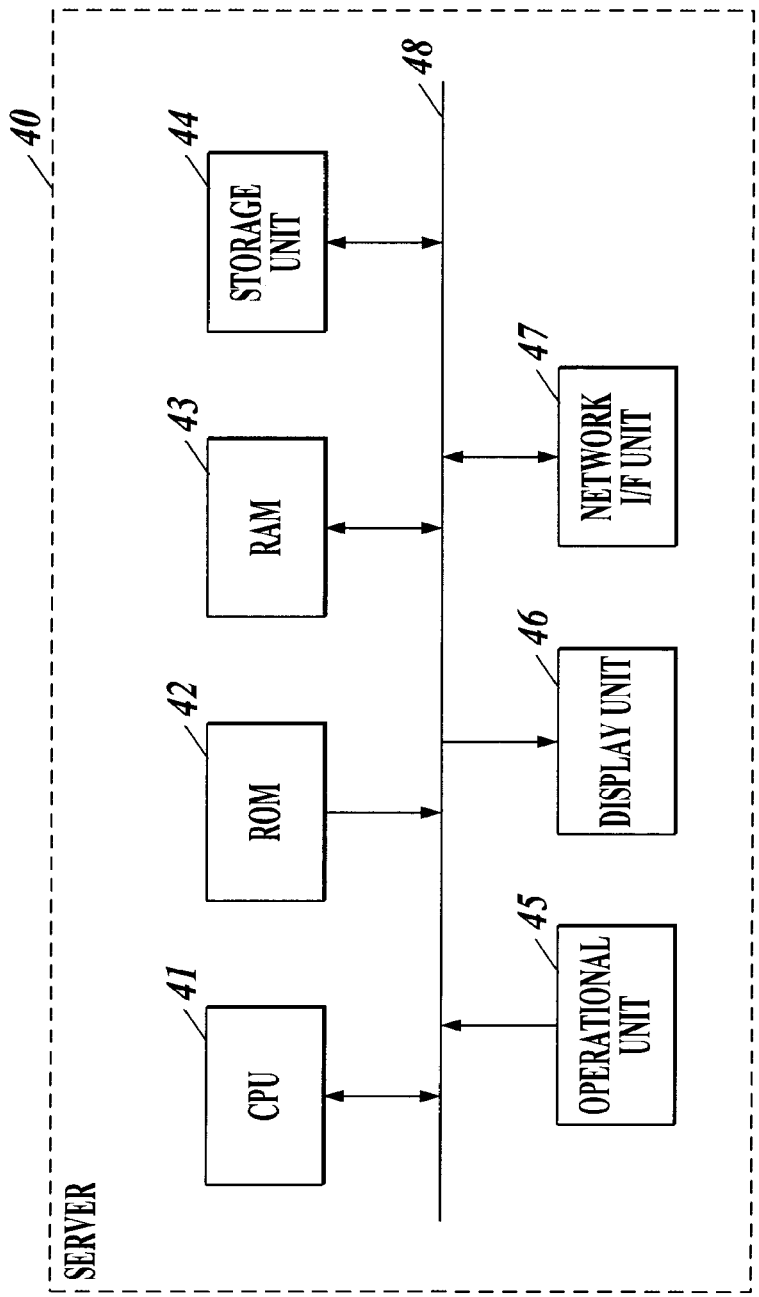
FIG. 12 is a block diagram illustrating a functional configuration of a server.

FIG. 12 illustrates a functional configuration of the server 40. As shown in FIG. 12, the server 40 includes a CPU 41 as a first controller, a ROM 42, a RAM 43, a storage unit 44, an operational unit 45, a display unit 46, and a network I/F unit 47, which are connected to one another through a bus 48.

The CPU 41 generally controls operations of these components of the server 40. The CPU 41 reads various processing programs stored in the ROM 42 or the storage unit 44 and expands each program in the RAM 43, and executes various types of processing in cooperation with the programs.

The ROM 42 includes a nonvolatile semiconductor memory, and stores the various processing programs and parameters and files necessary for execution of the programs.

The RAM 43 defines a work area for temporarily storing the various processing programs to be executed by the CPU 41 and data for the programs.

The storage unit 44 includes a storage device such as a nonvolatile semiconductor memory or a hard disc, and stores the various processing programs and data for various types of processing, for example.

The storage unit 44 stores first authentication information (a user name and a password) corresponding to a registered user that is beforehand permitted to log into each of the multi-functional peripherals 10a, 10b, ..., 10n.

In addition, the storage unit 44 stores login state information indicating a login state of a user corresponding to each of the multi-functional peripherals 10a, 10b, ..., 10n. The login state information includes information indicating the presence of a user that has logged in for each multi-functional peripheral, and a name of the user that has logged in.

The operational unit 45, which includes a keyboard including a cursor key, character input keys, and various function keys, and a pointing device such as a mouse, accepts input by a user. The operational unit 45 sends an operational signal received through a key or mouse operation to the keyboard to the CPU 41.

The display unit 46 includes a LCD, and displays various operational menus and processed results in accordance with display signals received from the CPU 41.

The network I/F unit 47 transmits/receives data to/from external devices through the network N.

The CPU 41 transmits an authentication result indicating a matching state of the second authentication information sent from one of the multi-functional peripherals 10a, 10b, ..., 10n through the network I/F unit 47 with the first authentication information stored in the storage unit 44 to a multi-functional peripheral as a source of the second authentication information.

The CPU 41 updates login state information stored in the storage unit 44 on the basis of information indicating login or logout of a user to one of the multi-functional peripherals 10a, 10b, ..., 10n sent from this multi-functional peripheral through the network I/F unit 47.

If the second authentication information of the user sent from one of the multi-functional peripherals 10a, 10b, ..., 10n through the network I/F unit 47 matches the first authentication information stored in the storage unit 44, the CPU 41 checks for the existence of another multi-functional peripheral into which the user has logged. In detail, the CPU 41 checks for the existence of another multi-functional peripheral into which one user has logged on the basis of the login state information for individual multi-functional peripherals stored in the storage unit 44.

If the CPU 41 determines the existence of another multi-functional peripheral into which one user has logged, the CPU 41 transmits a logout instruction of the user to this multi-functional peripheral through the network I/F unit 47.

An operation of the image forming system 200 will now be described.

Here, a case where a user A re-logs into the multi-functional peripheral 10a is exemplified.

Figure 13:
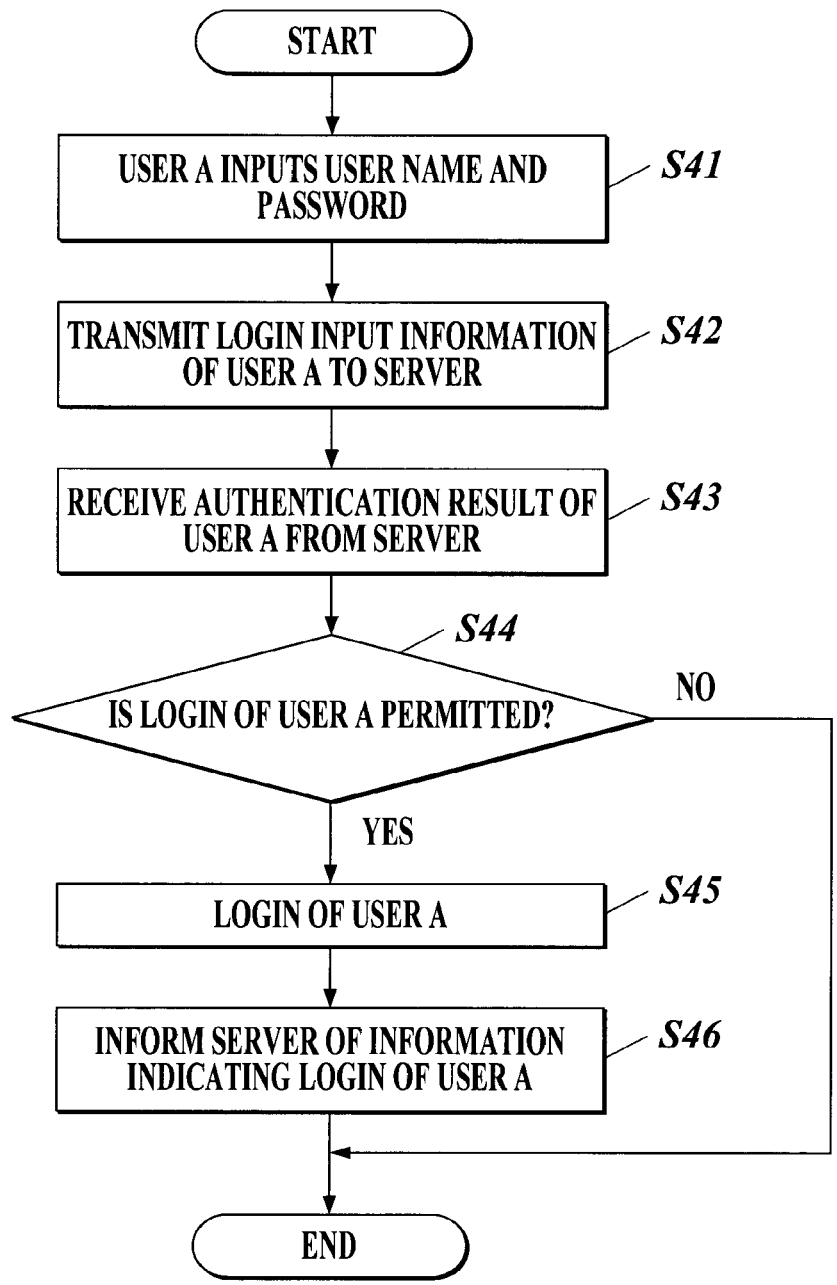
FIG. 13 is a flowchart illustrating a login process executed by a multi-functional peripheral of the second embodiment.

FIG. 13 is a flowchart illustrating a login process executed by the multi-functional peripheral 10a. This process is achieved by software processing through cooperation of the CPU 11 with a program stored in the ROM 12.

A user name and a password (the second authentication information) of the user A are input through an operation from the operational unit 15 by the user (step S41). The CPU 11 then sends the login input information (the second authentication information) of the user A received from the operational unit 15 to the server 40 through the network I/F unit 20 (step S42).

The CPU 11 then receives an authentication result of the user A from the server 40 through the network I/F unit 20 (step S43). The CPU 11 then checks for the permission state of login of the user A to the multi-functional peripheral 10a (step S44). In detail, the CPU 11 checks for the permission state of login of the user A to the multi-functional peripheral 10a on the basis of the authentication result sent from the server 40.

If login of the user A to the multi-functional peripheral 10a is permitted (step S44; YES), the CPU 11 allows the user A to log into the multi-functional peripheral 10a (step S45), and informs the server 40 of information indicating login of the user A to the multi-functional peripheral 10a through the network I/F unit 20 (step S46).

If login of the user A to the multi-functional peripheral 10a is not permitted in step S44 (step S44: NO), or after step S46 is completed, the login process is finished.

Figure 14:
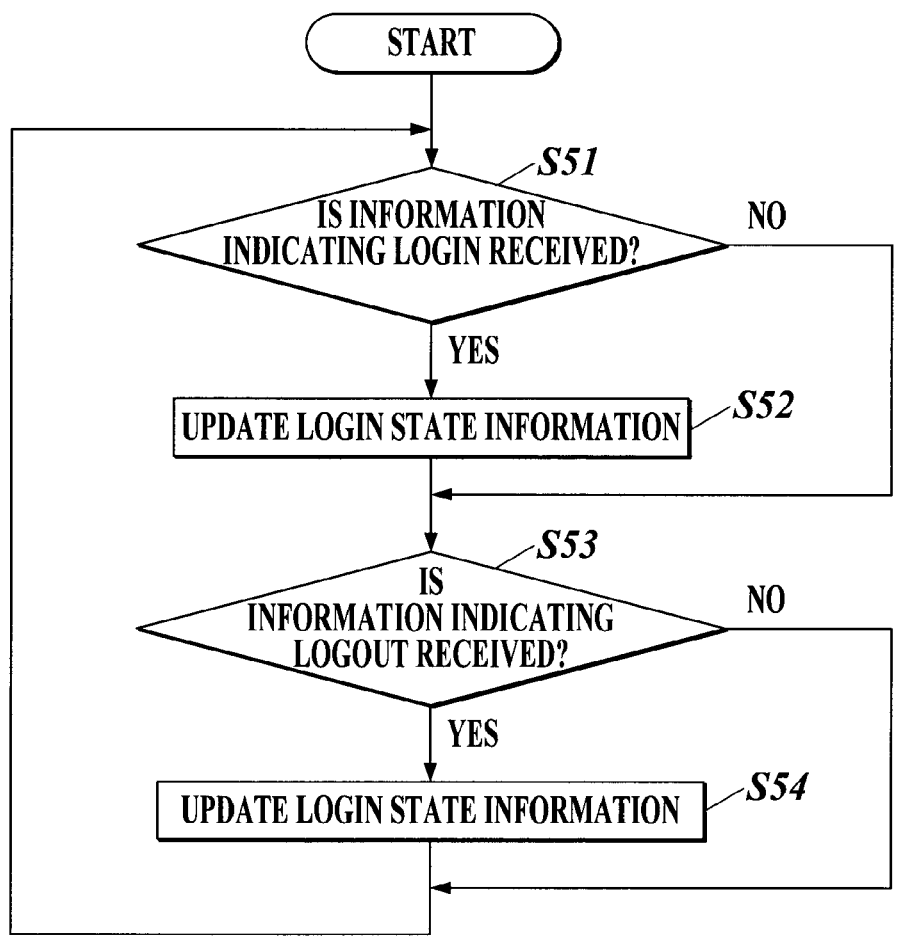
FIG. 14 is a flowchart illustrating a login state control process executed by the server in the second embodiment.

FIG. 14 is a flowchart illustrating a login-state control process executed by the server 40. This process is achieved by software processing through cooperation of the CPU 41 with a program stored in the storage unit 44.

If the CPU 41 receives information indicating login of a user to one of the multi-functional peripherals 10a, 10b, ..., 10n from this multi-functional peripheral through the network I/F unit 47 (step S51; YES), the CPU 41 updates the login state information of the multi-functional peripheral stored in the storage unit 44 (step S52). In detail, the CPU 41 changes "information indicating the presence of a login user" included in the login state information of the relevant multi-functional peripheral to "a login user", and adds a user name of the user that logs into the multi-functional peripheral.

If the CPU 41 does not receive information indicating the login of a user in step S51 (step S51; NO), or if the CPU 41 receives information indicating the logout of a user from one of the multi-functional peripherals 10a, 10b, ..., 10n through the network I/F unit 47 after step S52 (step S53; YES), the CPU 41 updates the login state information of this multi-functional peripheral stored in the storage unit 44 (step S54). In detail, the CPU 41 changes "information indicating the presence of a login user" included in the login state information of the relevant multi-functional peripheral to "no login user", and deletes a user name of the user that has logged into this multi-functional peripheral.

If the CPU 41 does not receive the information indicating logout of a user in step S53 (step S53; NO), or after step S54 is completed, the process returns to step S51, which is then repeated.

Figure 15:
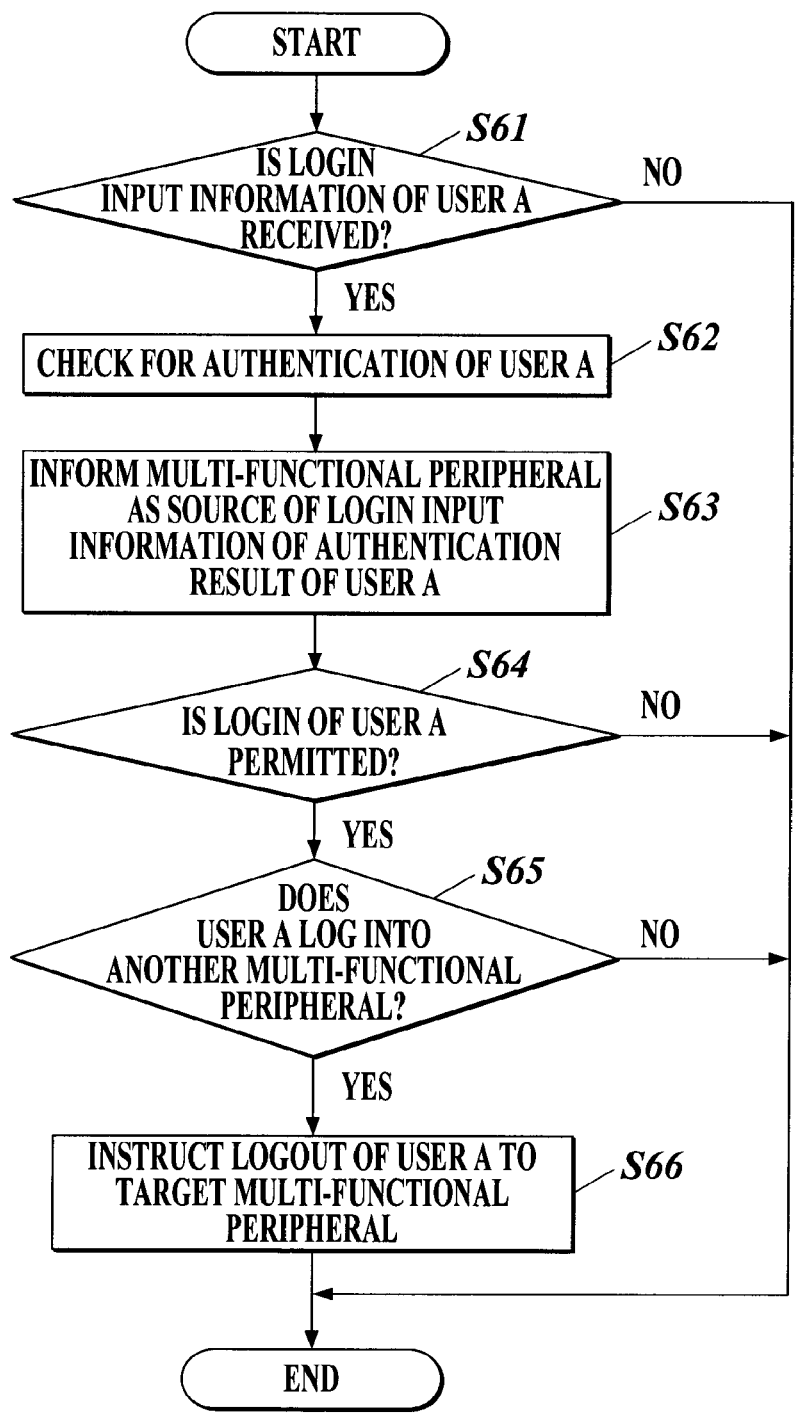
FIG. 15 is a flowchart illustrating a logout instruction process executed by the server in the second embodiment.

FIG. 15 is a flowchart illustrating a logout instruction process executed by the server 40. This process is executed during the login of the user A to the multi-functional peripheral 10a, and is achieved by software processing through cooperation of the CPU 41 with a program stored in the storage unit 44.

If the CPU 41 receives the login input information (the second authentication information) of the user A from the multifunctional peripheral 10a through the network I/F unit 47 (step S61; YES), the CPU 41 checks for authentication of the user A (step S62). In detail, the CPU 41 checks for a matched state between the second authentication information received from the multi-functional peripheral 10a and the first authentication information stored in the storage unit 44.

The CPU 41 then informs the multi-functional peripheral 10a as a source of the login input information of the authentication result of the user A through the network I/F unit (step S63).

The CPU 41 then checks for the permission state of login of the user A (step S64). If login of the user A is permitted (step S64; YES), namely, if the second authentication information received from the multi-functional peripheral 10a matches the first authentication information stored in the storage unit 44, the CPU 41 checks for the login state of the user A to each of the other multi-functional peripherals 10b, ..., 10n on the basis of the login state information stored in the storage unit 44 (step S65).

If the user A logs into one of the other multi-functional peripherals 10b, ..., 10n (step S65; YES), the CPU 41 transmits a logout instruction of the user A to the target multi-functional peripheral into which the user A logs through the network I/F unit 47 (step S66).

If the CPU 41 does not receive the login input information of the user A from the multi-functional peripheral 10a in step S61 (step S61; NO), if the login of the user A is not permitted in step S64 (step S64; NO), if the user A does not log into any of the other multi-functional peripherals 10b, ..., 10n in step S65 (step S65; NO), or after step S66 is completed, the logout instruction process is finished.

Figure 16:
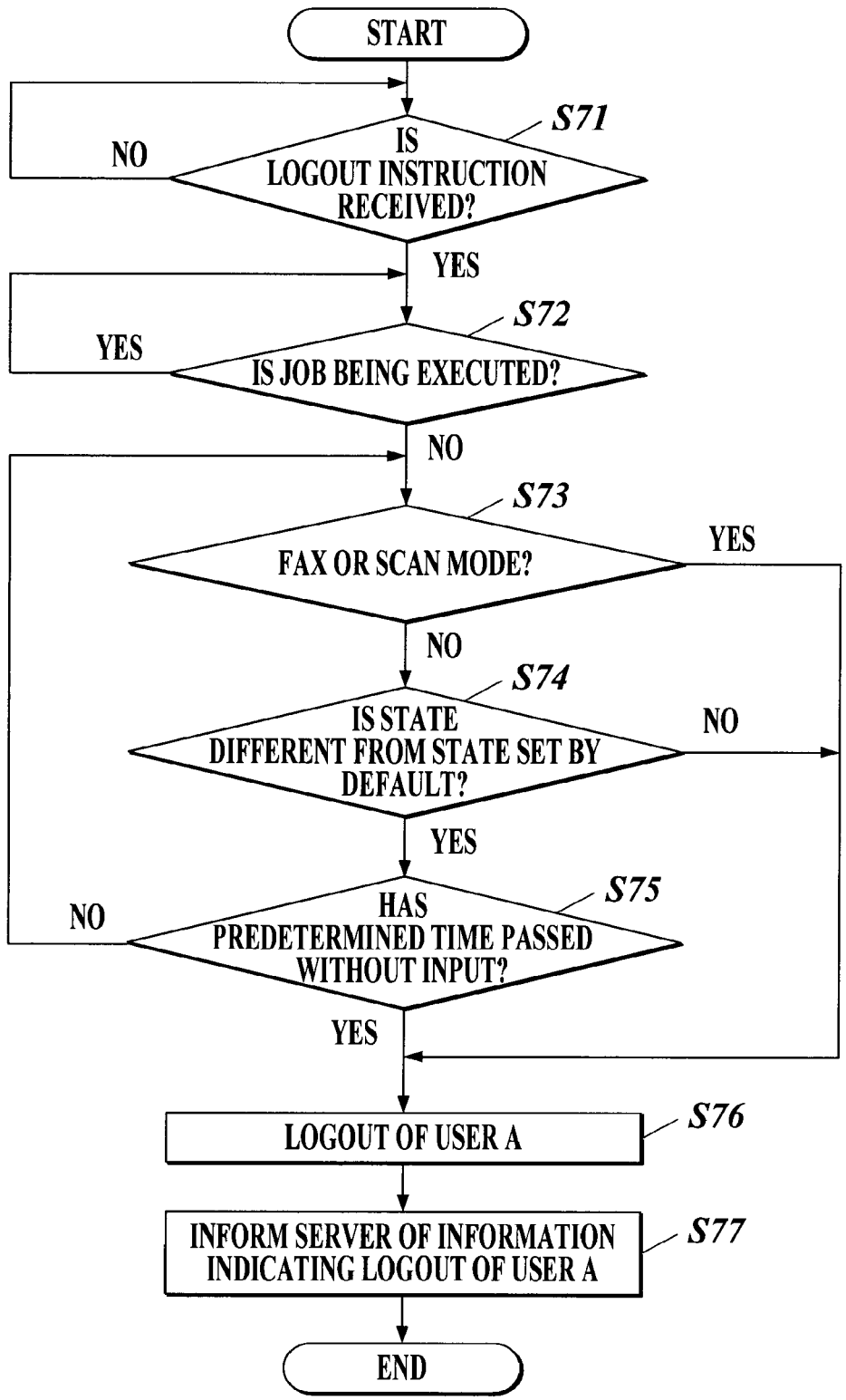
FIG. 16 is a flowchart illustrating a logout process executed by the multi-functional peripheral of the second embodiment.

FIG. 16 is a flowchart illustrating a logout process executed by a multi-functional peripheral (here, the multi-functional peripheral 10b is exemplified) into which the user A has logged before logging into the multi-functional peripheral 10a among the multi-functional peripherals 10b, ..., 10n other than the multi-functional peripheral 10a. This process is achieved by software processing through cooperation of the CPU 11 with a program stored in the ROM 12.

The CPU 11 determines whether the multi-functional peripheral 10b receives a logout instruction of the user A from the server 40 through the network I/F unit 20 (step S71). If the multi-functional peripheral 10b receives no information from the operational unit 15 for a predetermined time while does not receive the logout instruction of the user A, the CPU 11 performs the logout operation for the user A.

If the multi-functional peripheral 10b receives the logout instruction of the user A from the server 40 (step S71; YES), the CPU 11 determines whether any job for the user A is being executed (step S72). While a job for the user A is being executed (step S72; YES), the process is into a standby mode until the job is completed.

If no job for the user A is executed in step S72 (step S72; NO), the CPU 11 reads the function mode information stored in the storage unit 14 to determine whether the multi-functional peripheral 10b is in the FAX or scan mode or not (step S73). If the multi-functional peripheral 10b is in the FAX or scan mode (step S73; YES), the CPU 11 performs the logout operation for the user A (step S76).

If the multi-functional peripheral 10b is not in the FAX or scan mode in step S73 (step S73; NO), the CPU 11 maintains the login state. The CPU 11 then reads the setting information stored in the storage unit 14 to determine whether the multi-functional peripheral 10b is in a state different from a state set by default (step S74). In detail, if at least one setting item has a value different from the default value, the CPU 11 determines that the multi-functional peripheral 10b is in a state different from the state set by default. In contrast, if all the setting items have the default values, the CPU 11 determines that the multi-functional peripheral 10b is in the state set by default. If the multi-functional peripheral 10b is in the state set by default (step S74; NO), the CPU 11 performs the logout operation for the user A (step S76).

If the multi-functional peripheral 10b is in the state different from the state set by default in step S74 (step S74; YES), the CPU 11 maintains the login state. The CPU 11 then determines whether a predetermined time has passed without input from the operational unit 15 (step S75). If the predetermined time has not passed without input from the operational unit 15 (step S75; NO), the process returns to step S73.

If the predetermined time has passed without input from the operational unit 15 in step S75 (step S75; YES), the CPU 11 performs the logout operation for the user A (step S76).

After step S76, the CPU 11 informs the server 40 of information indicating logout of the user A from the multi-functional peripheral 10b through the network I/F unit (step S77).

This is the end of the logout process executed by the multi-functional peripheral 10b.

As described above, according to the second embodiment, if the second authentication information of one user received from one of the multi-functional peripherals 10a, 10b, ..., 10n matches the first authentication information stored in the storage unit 44 of the server 40, the server 40 transmits a logout instruction of the user to another multi-functional peripheral into which the user has logged. This prevents the multi-functional peripheral from being left in the login state, thus improving the security of the system.

In addition, the server 40 can check for the existence of another multi-functional peripheral into which the user has logged on the basis of the login state information stored in the storage unit 44.

In addition, if the multi-functional peripheral receives the instruction of logout while it is executing a job for a relevant user, a logout operation is performed after completion of the job, thus preventing logout of a job in progress.

In addition, if another multi-functional peripheral receives the logout instruction while being in a predetermined function setting state, the login state is maintained. This enables appropriate determination on logout depending on a state of this multi-functional peripheral. In detail, if another multi-functional peripheral is in a state different from a state set by default, the multi-functional peripheral is maintained in the login state; hence, if such a multi-functional peripheral is in a setting state having a modified setting item, the modified setting state can be maintained.

[Modification 1 of Second Embodiment]

Modification 1 of the second embodiment will now be described.

In the second embodiment, if the server 40 sends a logout instruction of one user to another multi-functional peripheral, and if this multi-functional peripheral is in a state different from a state set by default, the login state is maintained. In Modification 1, if the server 40 sends a logout instruction of one user to another multi-functional peripheral, and if this multi-functional peripheral has a predetermined number or more of setting items having modifications from default values, a login state is maintained. The predetermined number can be appropriately varied. The other configurations and processes are the same as in the second embodiment.

Figure 17:
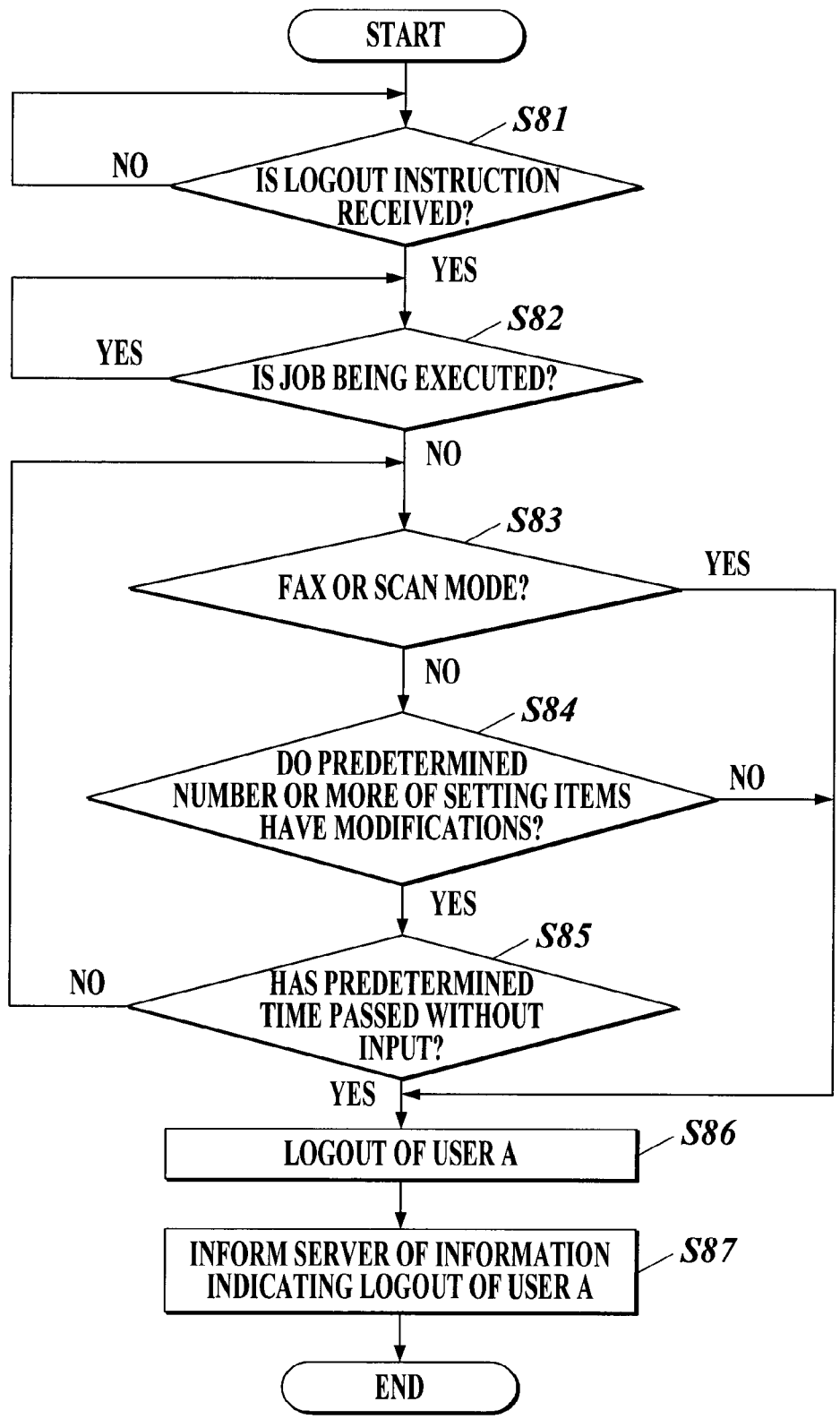
FIG. 17 is a flowchart illustrating a logout process in Modification 1 of the second embodiment.

FIG. 17 is a flowchart illustrating a logout process executed by a multi-functional peripheral (here, the multi-functional peripheral 10*b* is exemplified) into which the user A has logged before the logging into the multi-functional peripheral 10*a* among the multi-functional peripherals 10*b*, . . . , 10*n* other than the multi-functional peripheral 10*a*. This process is achieved by software processing through cooperation of the CPU 11 with a program stored in the ROM 12.

The process of steps S81 to S83 in FIG. 17 is the same as that of steps S71 to S73 in FIG. 16, and duplicated description is omitted.

If the multi-functional peripheral 10*b* is not in the FAX or scan mode in step S83 (step S83; NO), the CPU 11 reads the setting information stored in the storage unit 14 to check for the existence of modifications from default values for a predetermined number or more of setting items in the multi-functional peripheral 10*b* on the basis of information indicating modifications from default values for individual setting items (step S84). If a predetermined number or more of setting items have no modification from default values (step S84; NO), the CPU 11 performs the logout operation for the user A (step S86).

If the predetermined number or more of setting items have modifications from default values in step S84 (step S84; YES), the CPU 11 maintains the login state, and the process shifts to step S85.

The process of steps S85 to S87 in FIG. 17 is the same as that of steps S75 to S77 in FIG. 16, and duplicated description is omitted.

This is the end of the logout process in Modification 1.

As described above, according to Modification 1 of the second embodiment, which has advantageous effects similar to those in the second embodiment, if another multi-functional peripheral receiving the instruction of logout has a predetermined number or more of setting items having modifications from default values, the login state is maintained; hence, if this multi-functional peripheral has a predetermined number or more of setting items having modifications, such a modified setting state can be maintained.

[Modification 2 of Second Embodiment]

Modification 2 of the second embodiment will now be described.

In the second embodiment, if the sever 40 sends a logout instruction of one user to another multi-functional peripheral, and if this multi-functional peripheral is in a state different from a state set by default, the login state is maintained. In Modification 2, if the sever 40 sends the logout instruction of one user to another multi-functional peripheral and if this multi-functional peripheral has a predetermined setting item having a modification from a default value, the login state is maintained. The predetermined setting item can be appropriately varied. The other configurations and processes are the same as in the second embodiment.

Figure 18:
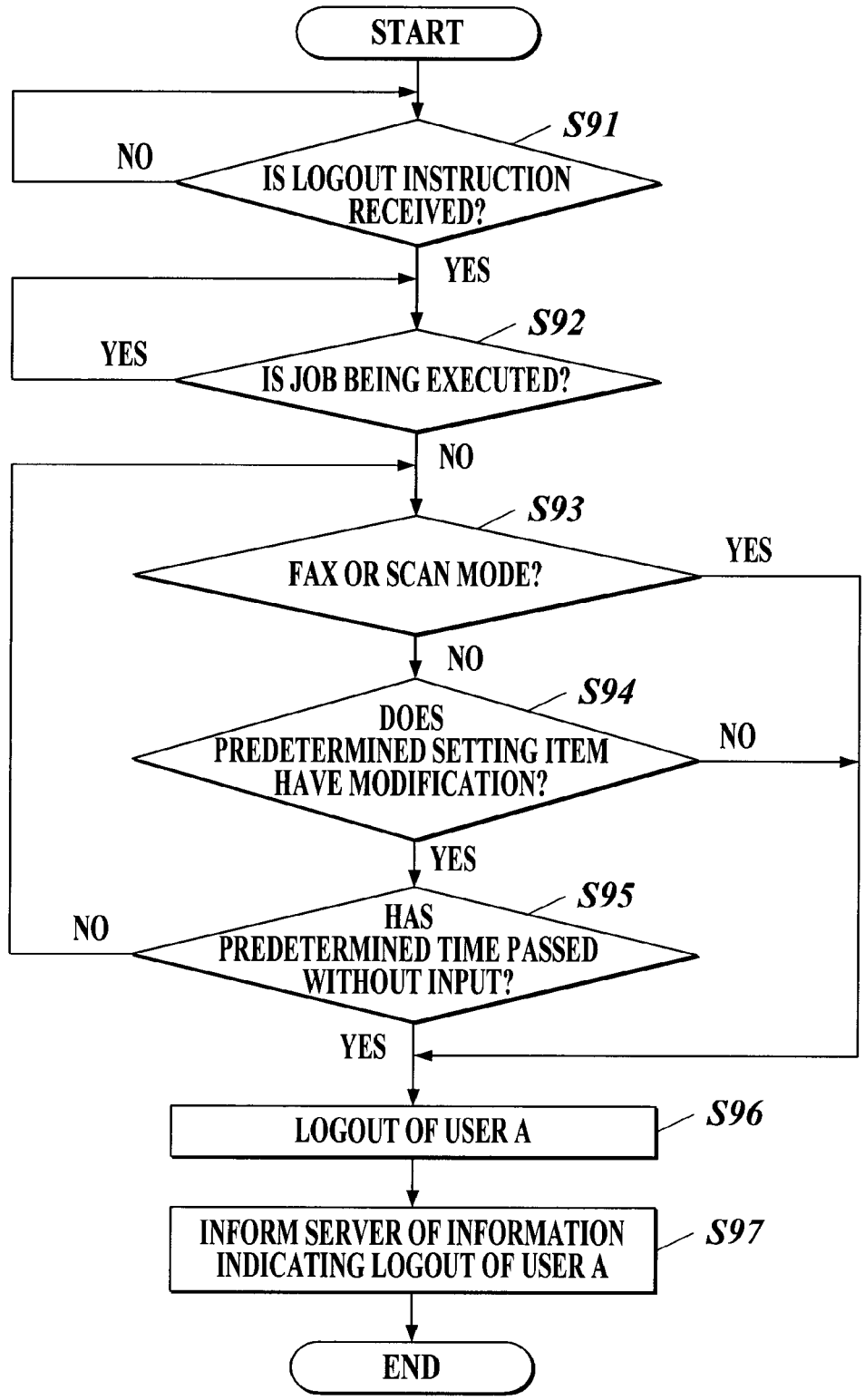
FIG. 18 is a flowchart illustrating a logout process in Modification 2 of the second embodiment.

FIG. 18 is a flowchart illustrating a logout process executed by a multi-functional peripheral (here, the multi-functional peripheral 10*b* is exemplified) into which the user A has logged before logging into the multi-functional peripheral 10*a* among the multi-functional peripherals 10*b*, . . . , 10*n* other than the multi-functional peripheral 10*a*. This process is achieved by software processing through cooperation of the CPU 11 with a program stored in the ROM 12.

The process of steps S91 to S93 in FIG. 18 is the same as that of steps S71 to S73 in FIG. 16, and duplicated description is omitted.

If the multi-functional peripheral 10*b* is not in the FAX or scan mode in step S93 (step S93; NO), the CPU 11 reads the setting information stored in the storage unit 14 to check for the existence of a modification from a default value for a predetermined setting item in the multi-functional peripheral 10*b* on the basis of information indicating modifications from default values for individual setting items (step S94). If the predetermined setting item has no modification from a default value (step S94; NO), the CPU 11 performs the logout operation for the user A (step S96).

If the predetermined setting item has a modification from the default value in step S94 (step S94; YES), the CPU 11 maintains the login state, and the process shifts to step S95.

The process of steps S95 to S97 in FIG. 18 is the same as that of steps S75 to S77 in FIG. 16, and duplicated description is omitted.

This is the end of the logout process in Modification 2.

As described above, according to Modification 2 of the second embodiment, which has advantageous effects similar to those in the second embodiment, if another multi-functional peripheral receiving the instruction of logout has a predetermined setting item having a modification from a default value, the login state is maintained; hence, if this multi-functional peripheral has a predetermined setting item having a modification, such a modified setting state can be maintained.

In the second embodiment and Modifications 1 and 2 thereof, every time a user logs in/out to/from each of the multi-functional peripherals 10*a*, 10*b*, . . . , 10*n*, the relevant multi-functional peripheral informs the server 40 of the login or logout. Alternatively, if the second authentication information of one user received from one of the multi-functional peripherals matches the first authentication information stored in the storage unit 44, the server 40 may put a query on a login state of the user to all other multi-functional peripherals.

Third Embodiment

A third embodiment of the present invention will now be described.

An image forming system of the third embodiments has the same configuration as that of the image forming system 100 shown in the first embodiment, and thus FIG. 1 is referred and duplicated illustration and description are omitted. In addition, the multi-functional peripherals 10a, 10b, ..., 10n each have the same configuration as in the first embodiment, and thus FIG. 2 is referred and duplicated illustration and description are omitted. A configuration and a process inherent in the third embodiment will now be described.

The CPU 11 of the multi-functional peripheral 10a permits logging into the multi-functional peripheral 10a if second authentication information (a combination of a user name and a password) received from the operational unit 15 matches first authentication information (a combination of a user name and a password) stored in the storage unit 14.

After one user logs into the multi-functional peripheral 10a, the CPU 11 of the multi-functional peripheral 10a checks for the existence of another multi-functional peripheral into which the user has logged. In detail, the CPU 11 puts a query on login of one user to all other ones among the multi-functional peripherals 10a, 10b, ..., 10n, and checks for the existence of another multi-functional peripheral into which the user has logged on the basis of the result of the query.

If the CPU 11 of the multi-functional peripheral 10a determines the existence of another multi-functional peripheral into which one user has logged, the CPU 11 acquires setting information stored in the storage unit 14 of this multi-functional peripheral from the multi-functional peripheral through the network I/F unit 20, and sets the setting information of the multi-functional peripheral in the multi-functional peripheral 10a. Here, if the setting information of the relevant multi-functional peripheral is different from that set by default of the multi-functional peripheral, such setting information is set in the multi-functional peripheral 10a.

If a certain setting content in the setting information of the relevant multi-functional peripheral cannot be set in the multi-functional peripheral 10a, the CPU 11 of the multi-functional peripheral 10a informs the multi-functional peripheral of such a state, and changes such a non-settable content to a content settable in the multi-functional peripheral 10a, and resets the new content.

For example, if the post-processor 19 of the multi-functional peripheral 10a does not have the stapling function though stapling is set as the setting information of another multi-functional peripheral, or if no staple remains though the post-processor 19 has the stapling function, the setting information is changed to "no staple".

In addition, if double stapling is set as the setting information of another multi-functional peripheral, and if the post-processor 19 of the multi-functional peripheral 10a cannot perform the double stapling though it can perform corner stapling, the setting information is changed to "corner stapling".

In addition, if the read resolution of the image reading unit 17 or the write resolution of the image forming unit 18 is different between the multi-functional peripheral 10a and another multi-functional peripheral, the read or write resolution is changed to that of the multi-functional peripheral 10a.

The CPU 11 of the multi-functional peripheral 10a sets the setting information of another multi-functional peripheral in the multi-functional peripheral 10a, and then transmits a logout instruction of one user to this multi-functional peripheral through the network I/F unit 20.

Other multi-functional peripherals 10b, ..., 10n each have the same configuration as that of the multi-functional peripheral 10a; hence, the same numerals are used therein and duplicated description is omitted.

An operation of the image forming system 100 will now be described.

In the following description, a user A logs into the multi-functional peripheral 10a.

Figure 19:
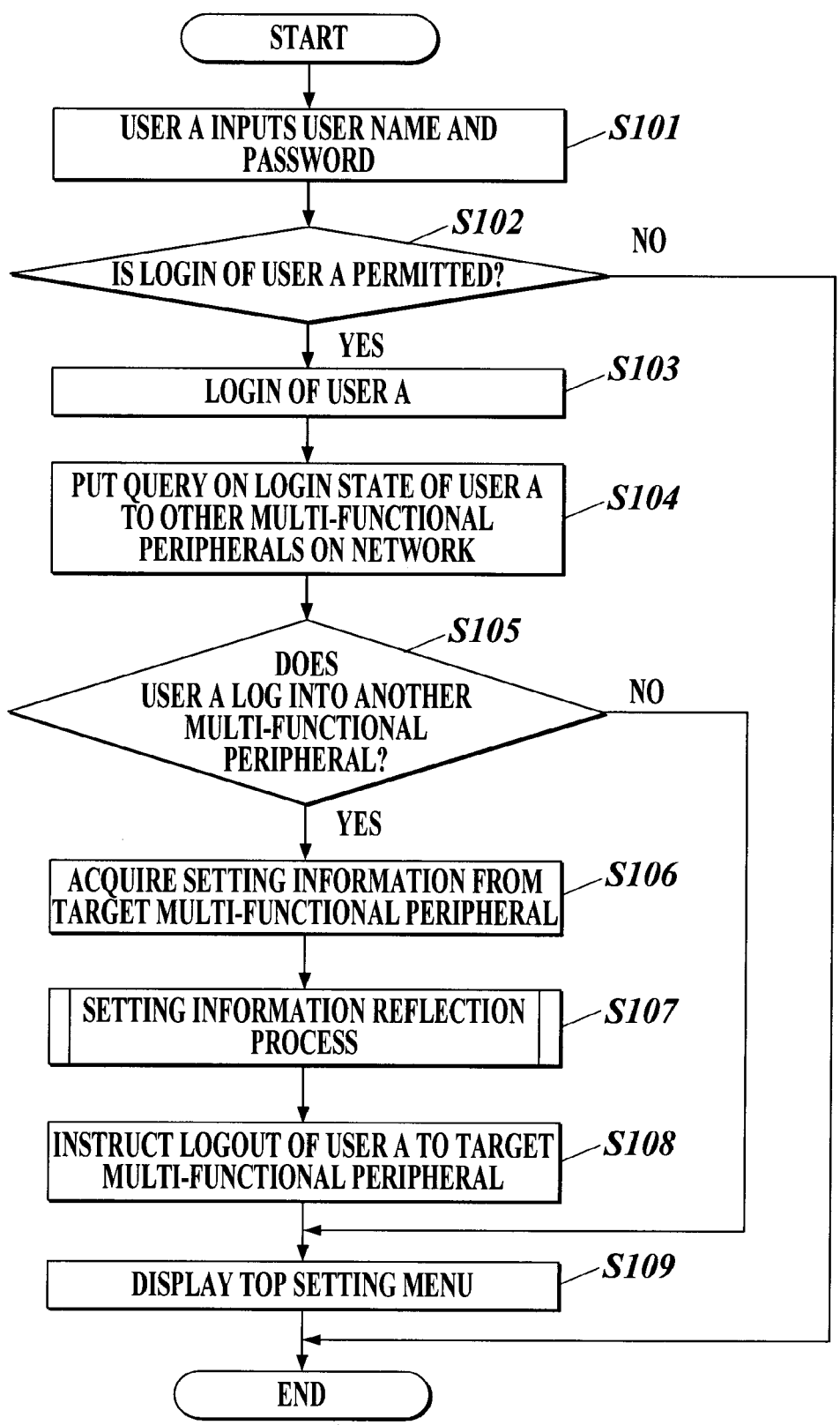
FIG. 19 is a flowchart illustrating a process executed by one multi-functional peripheral of a third embodiment.

FIG. 19 is a flowchart illustrating a process executed by the multi-functional peripheral 10a. This process is achieved by software processing through cooperation of the CPU 11 with a program stored in the ROM 12.

Figure 20:
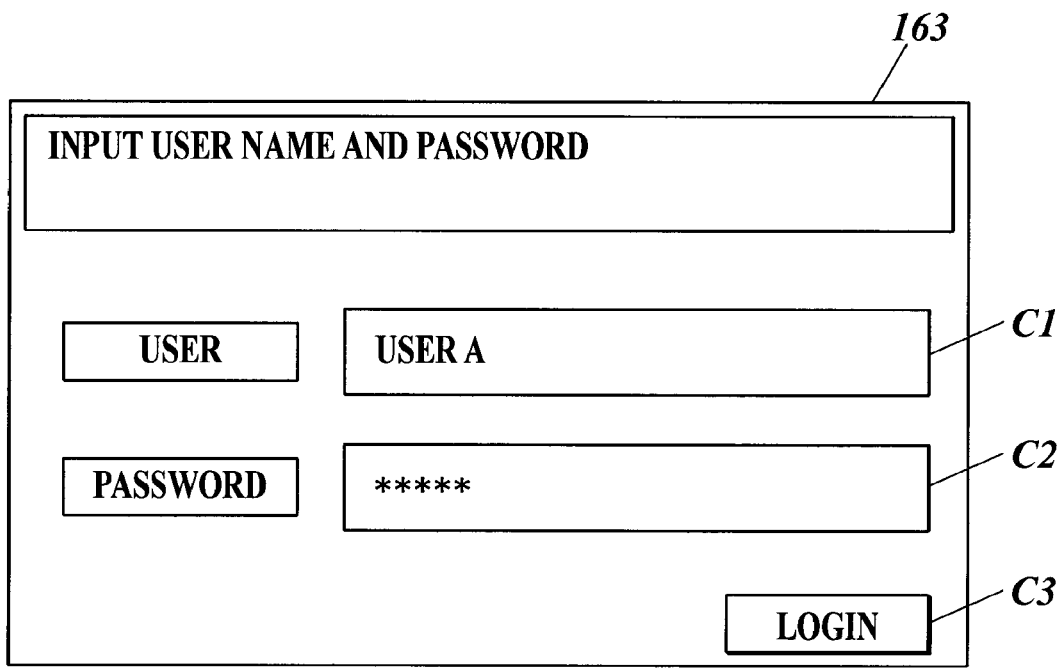
FIG. 20 illustrates an exemplary authentication information input menu.

The CPU 11 displays an authentication information input menu 163 shown in FIG. 20 on the display unit 16. The authentication information input menu 163 includes a user-name input region C1, a password input region C2, and a login button C3.

In the authentication information input menu 163, a user name and a password (second authentication information) of a user A are input into the user-name input region C1 and the password input region C2, respectively, through operation from the operational unit 15 by a user (step S101), and the login button C3 is pressed. The CPU 11 then checks for the permission state of login of the user A to the multi-functional peripheral 10a (step S102). In detail, the CPU 11 checks for a matched state between the second authentication information received from the operational unit 15 and the first authentication information stored in the storage unit 14.

If the login of the user A to the multi-functional peripheral 10a is permitted (step S102: YES), namely, if the second authentication information received from the operational unit 15 matches the first authentication information stored in the storage unit 14, the CPU 11 performs the login operation for the user A to the multi-functional peripheral 10a (step S103).

The CPU 11 then puts a query on a login state of the user A to all the other multi-functional peripherals 10b, ..., 10n on the network N through the network I/F unit 20 (step S104). The CPU 11 then receives information indicating the login state of the user A from each of the multi-functional peripherals 10b, ..., 10n through the network I/F unit 20.

The CPU 11 then checks for the login state of the user A to each of the multi-functional peripherals 10b, ..., 10n on the basis of the result of the query in step S104 (step S105). If the user A logs into one of the multi-functional peripherals 10b, ..., 10n (step S105; YES), the CPU 11 acquires setting information stored in the storage unit 14 of the multi-functional peripheral into which the user A logs (hereinafter, referred to as target multi-functional peripheral) from the target multi-functional peripheral through the network I/F unit 20 (step S106). In detail, the CPU 11 transmits an acquisition requirement of the setting information of the target multi-functional peripheral to the target multi-functional peripheral through the network I/F unit 20, and then receives the setting information transmitted from the target multi-functional peripheral. The CPU 11 thus acquires the setting information of the target multi-functional peripheral and stores the setting information in the RAM 13.

The CPU 11 performs a setting information reflection process (step S107).

Figure 21:
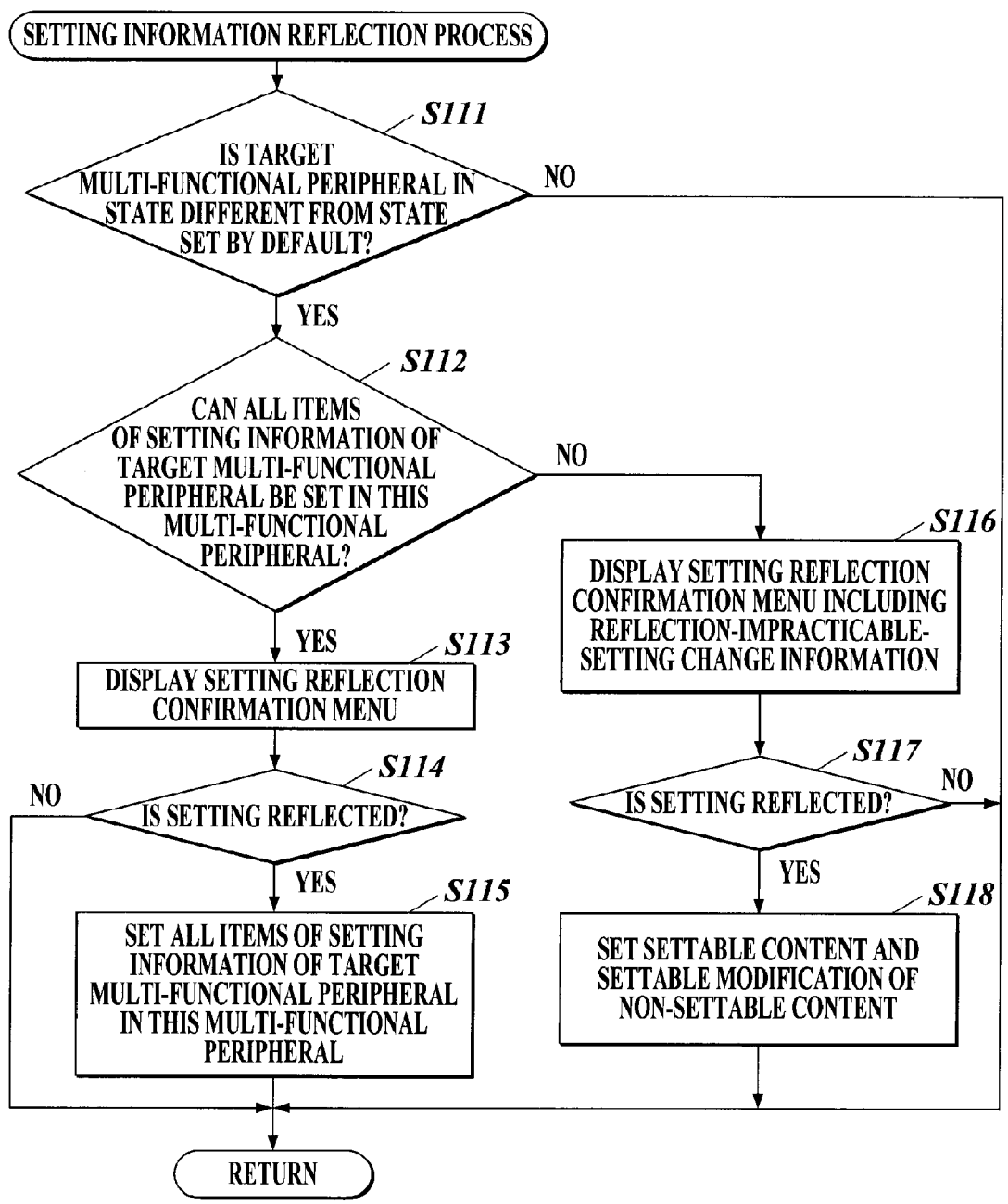
FIG. 21 is a flowchart illustrating a setting information reflection process.

In the setting information reflection process, as shown in FIG. 21, the CPU 11 determines whether the setting information of the target multi-functional peripheral is different from setting information set by default of the target multi-functional peripheral on the basis of the setting information of the target multi-functional peripheral (step S111). In detail, if at least one setting item has a value different from the default value, the CPU 11 determines that the target multi-functional peripheral is in a state different from the state set by default. In contrast, if all the setting items have the default values, the CPU 11 determines that the target multi-functional peripheral is in the state set by default.

If the setting information of the target multi-functional peripheral is different from setting information set by default (step S111; YES), the CPU 11 determines whether all the items of the setting information of the target multi-functional peripheral can be set in the multi-functional peripheral 10a (step S112). If all the items of the setting information of the target multi-functional peripheral can be set in the multi-functional peripheral 10a (step S112; YES), the CPU 11 displays a setting reflection confirmation menu 164 shown in FIG. 22 on the display unit 16 (step S113).

The setting reflection confirmation menu 164 includes a setting information display region C4, a YES button C5, and a NO button C6. The setting information display region C4 is to display the setting information of the target multi-functional peripheral. In the target multi-functional peripheral, a paper size of A4, the number of documents of five, a magnification of 70.7%, single-sided printing to double-sided printing, 2 in 1, sorting, and corner stapling are set.

If a user operates the operational unit 15 to select the YES button C5 in the setting reflection confirmation menu 164 (step S114; YES), the CPU 11 sets all the items of the setting information of the target multi-functional peripheral in the multi-functional peripheral 10a (step S115). In detail, the CPU 11 determines the setting information of the target multi-functional peripheral as setting information of the multi-functional peripheral 10a, and stores the setting information in the storage unit 14 of the multi-functional peripheral 10a.

If the setting information of the target multi-functional peripheral has a setting content that cannot be set in the multi-functional peripheral 10a in step S112 (step S112; NO), the CPU 11 displays a setting reflection confirmation menu 165 including reflection-impracticable-setting change information shown in FIG. 23 on the display unit 16 (step S116). The reflection-impracticable-setting change information indicates a way of changing the content that cannot be set in the multi-functional peripheral 10a into a content that can be set in the multi-functional peripheral 10a.

The setting reflection confirmation menu 165 including the reflection-impracticable-setting change information includes a setting information display region C7, a YES button C8, and a NO button C9. In the setting information display region C7, among the setting contents of the setting information of the target multi-functional peripheral, the content that can be set in the multi-functional peripheral 10a is directly displayed, while the content that cannot be set in the multi-functional peripheral 10a is shown as a non-settable content, and an alternative is displayed as a settable modification of the non-settable content. In this case, while a paper size of A4, the number of documents of five, a magnification of 70.7%, single-sided printing to double-sided printing, 2 in 1, and sorting are displayed as the contents that are settable in the multi-functional peripheral 10a, "corner stapling" that cannot be set in the multi-functional peripheral 10a is not displayed, and a message indicating a change of "corner stapling" to "no staple" is displayed instead.

If a user operates the operational unit 15 to select the YES button C8 in the setting reflection confirmation menu 165 including the reflection-impracticable-setting change information (step S117; YES), the CPU 11 sets the settable contents and a settable modification of the non-settable content in the multi-functional peripheral 10a, among the contents of the setting information of the target multi-functional peripheral (step S118).

If the setting information of the target multi-functional peripheral is equal to the setting information set by default in step S111 (step S111; NO), if the NO button C6 is selected in the setting reflection confirmation menu 164 in step S114 (step S114; NO), if the NO button C9 is selected in the setting reflection confirmation menu 165 including the reflection-impracticable-setting change information in step S117 (step S117; NO), or after step S115 or S118 is completed, the setting information reflection process is finished.

To return to FIG. 19, the CPU 11 transmits a logout instruction of the user A to the target multi-functional peripheral into which the user A logs through the network I/F unit 20 (step S108).

If the user A does not log into any of the other multi-functional peripherals 10b, . . . , 10n in step S105 (step S105; NO), or after step S108 is completed, the CPU 11 displays a top setting menu on the display unit 16 (step S109).

Figure 22:
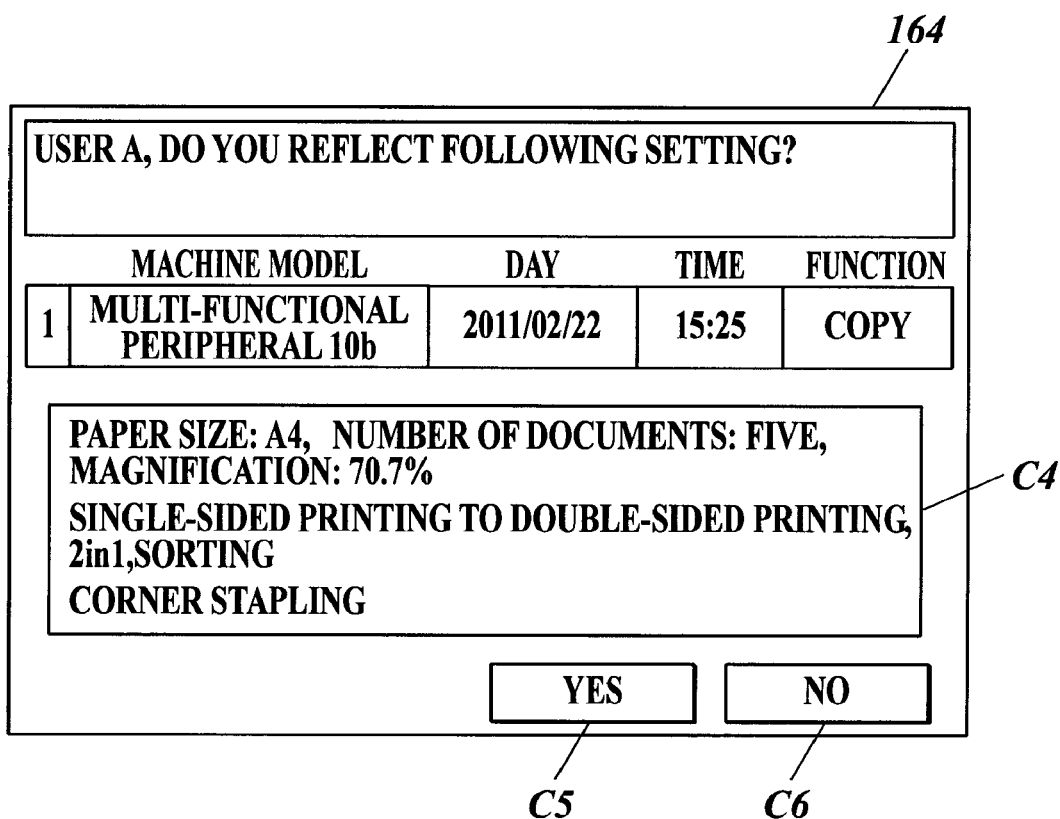
FIG. 22 illustrates an exemplary setting reflection confirmation menu.

If the YES button C5 is selected in the setting reflection confirmation menu 164 of FIG. 22 (step S114; YES), a top setting menu 166 shown in FIG. 24 is displayed. The top setting menu 166 reflects all the setting contents displayed in the setting information display region C4 of the setting reflection confirmation menu 164.

Figure 25:
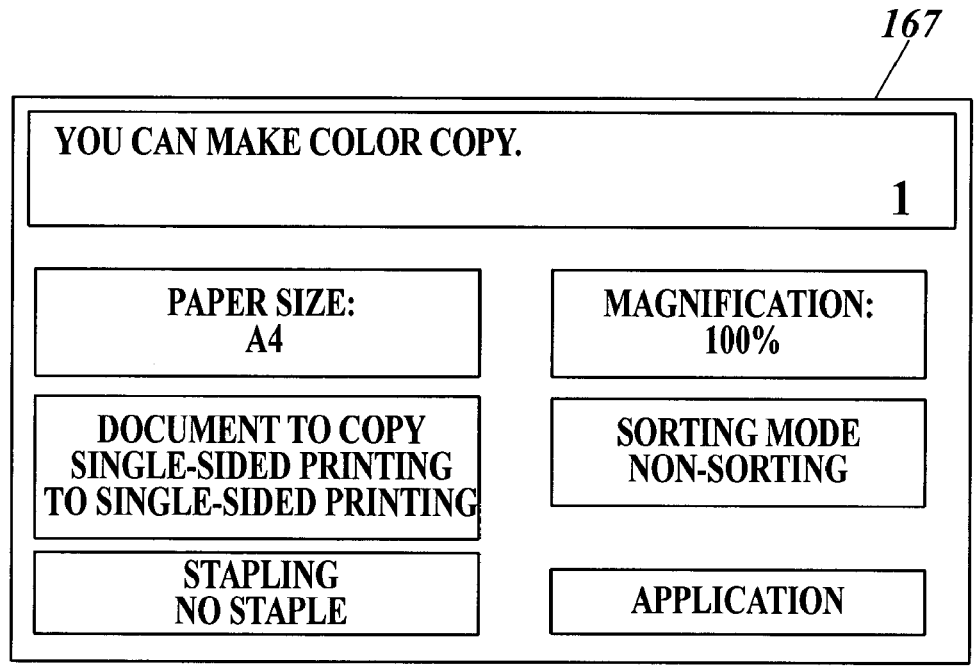
FIG. 25 illustrates another exemplary top setting menu.

If the NO button C6 is selected in the setting reflection confirmation menu 164 of FIG. 22 (step S114; NO), a top setting menu 167 shown in FIG. 25 is displayed. The top setting menu 167 shows the state set by default of the multi-functional peripheral 10a.

Figure 26:
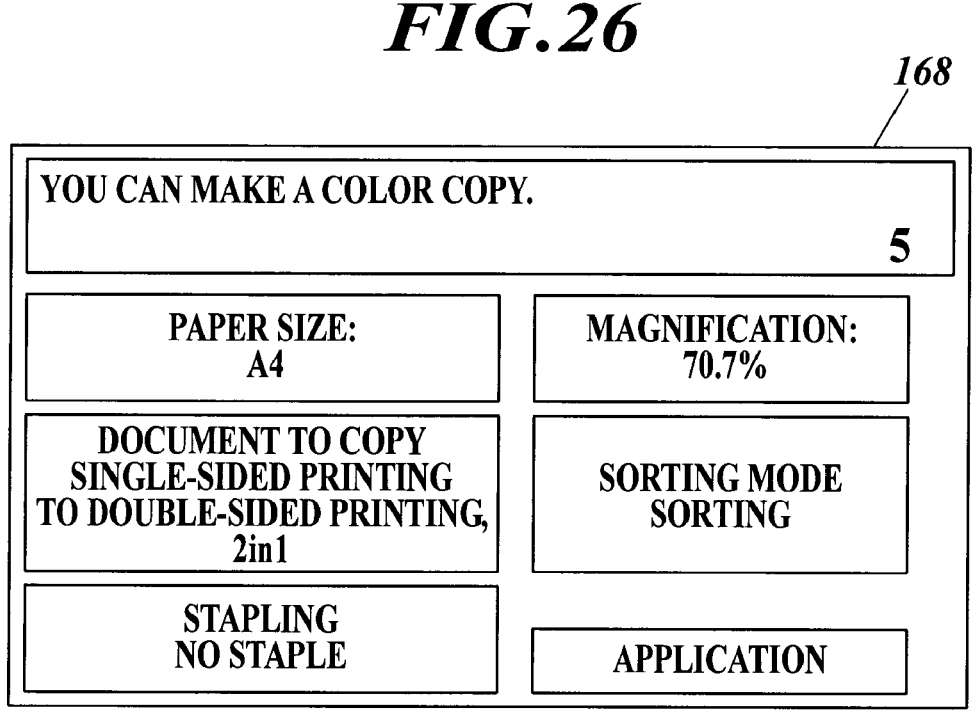
FIG. 26 illustrates another exemplary top setting menu.

If the YES button C8 is selected in the setting reflection confirmation menu 165 including the reflection-impracticable-setting change information shown in FIG. 23 (step S117; YES), a top setting menu 168 shown in FIG. 26 is displayed. The top setting menu 168 reflects the contents settable in the multi-functional peripherals 10a displayed in the setting information display region C7 of the setting reflection confirmation menu 165 including the reflection-impracticable-setting change information, and the settable modification of the content that cannot be set in the multi-functional peripheral 10a.

If the NO button C9 is selected in the setting reflection confirmation menu 165 including the reflection-impracticable-setting change information shown in FIG. 23 (step S117; NO), the same top setting menu 167 as in FIG. 25 is displayed.

If the login of the user A to the multi-functional peripheral 10a is not permitted in step S102 (step S102; NO), or after step S109 is completed, the process executed by the multi-functional peripheral 10a is finished.

Figure 27:
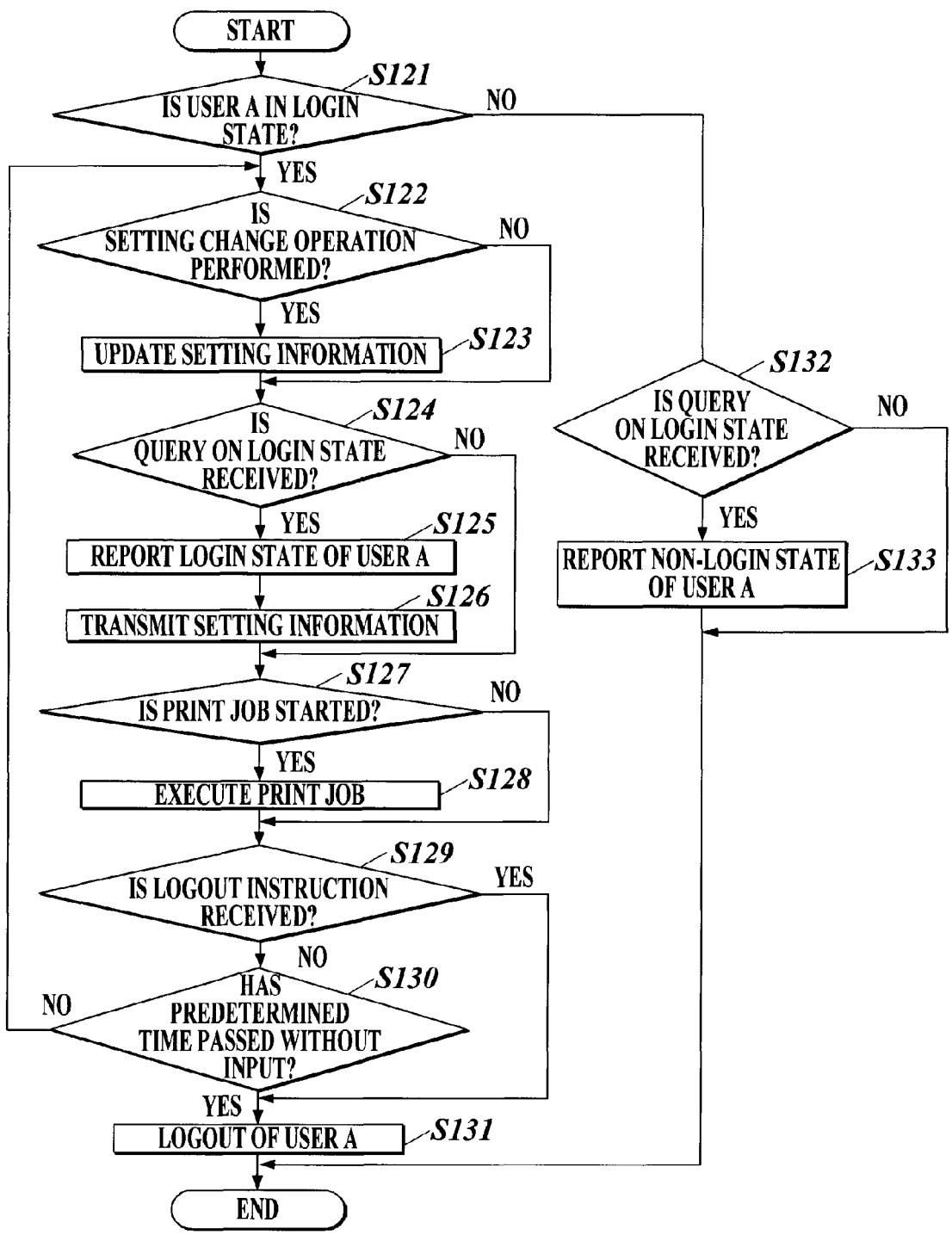
FIG. 27 is a flowchart illustrating a process executed by another multi-functional peripheral of the third embodiment.

FIG. 27 is a flowchart illustrating a process executed by the multi-functional peripheral 10b among the multi-functional peripherals 10b, . . . , 10n other than the multi-functional peripheral 10a. This process is achieved by software processing through cooperation of the CPU 11 with a program stored in the ROM 12.

If the user A logs into the multi-functional peripheral 10b (step S121; YES), the CPU 11 checks for the existence of a setting change operation through an operation from the operational unit 15 (step S122). If the CPU 11 determines the setting change operation (step S122; YES), the CPU 11 updates the setting information of the multi-functional peripheral 10*b* stored in the storage unit 14 on the basis of the setting change operation (step S123).

If the CPU 11 determines no setting change operation in step S122 (step S122; NO), or after step S123 is completed, the CPU 11 checks for the existence of a query on a login state of the user A from the multi-functional peripheral 10*a* (step S124). If the CPU 11 determines the query on a login state of the user A from the multi-functional peripheral 10*a* (step S124; YES), the CPU 11 informs the multi-functional peripheral 10*a* of the login state of the user A through the network I/F unit 20 (step S125), and transmits the setting information of the multi-functional peripheral 10*b* to the multi-functional peripheral 10*a* (step S126).

If the CPU 11 determines no query on a login state of the user A from the multi-functional peripheral 10*a* in step S124 (step S124; NO), or after step S126 is completed, the CPU 11 determines whether a print job is started (step S127). If the print job is started (step S127; YES), the CPU 11 controls the image forming unit 18 to execute the print job (step S128).

If the print job is not started in step S127 (step S127; NO), or after step S128 is completed, the CPU 11 determines whether the multi-functional peripheral 10*b* receives a logout instruction of the user A from the multi-functional peripheral 10*a* through the network I/F unit 20 (step S129).

If the multi-functional peripheral 10*b* does not receive the logout instruction of the user A (step S129; NO), the CPU 11 determines whether a predetermined time has passed without input from the operational unit 15 (step S130). If the predetermined time has not passed without input from the operational unit 15 (step S130; NO), the process returns to step S122, and steps S122 to S130 are repeated.

If the multi-functional peripheral 10*b* receives the logout instruction of the user A from the multi-functional peripheral 10*a* in step S129 (step S129; YES), or if the predetermined time has passed without input from the operational unit 15 in step S130 (step S130; YES), the CPU 11 performs the logout operation for the user A (step S131).

If the user A does not log into the multi-functional peripheral 10*b* in step S121 (step S121; NO), the CPU 11 checks for the existence of a query on a login state of the user A from the multi-functional peripheral 10*a* (step S132). If the CPU 11 determines the query on a login state of the user A from the multi-functional peripheral 10*a* (step S132; YES), the CPU 11 informs the multi-functional peripheral 10*a* of the non-login state of the user A through the network I/F unit 20 (step S133).

If the CPU 11 determines no query on a login state of the user A from the multi-functional peripheral 10*a* in step S132 (step S132; NO), or after step S133 or S131 is completed, the process executed by the multi-functional peripheral 10*b* is finished.

While the multi-functional peripheral 10*b* has been exemplified among the multi-functional peripherals 10*b*, . . . , 10*n* other than the multi-functional peripheral 10*a*, other multi-functional peripherals also have similar functions.

As described above, according to the third embodiment, if one user logs into a first multi-functional peripheral of the multi-functional peripherals 10*a*, 10*b*, . . . , 10*n*, setting information of a second multi-functional peripheral into which the user has logged is acquired from the second multi-functional peripheral, and the setting information of the second multi-functional peripheral is set in the first multi-functional peripheral, thus improving operability in setting of the multi-functional peripheral. As a result, setting information of the second multi-functional peripheral can be readily transferred to the first multi-functional peripheral, thus eliminating a troublesome reset operation in the first multi-functional peripheral.

In addition, the first multi-functional peripheral puts a query to all other multi-functional peripherals, so that the first multi-functional peripheral can check for the existence of the second multi-functional peripheral into which the user has logged.

In addition, a content that cannot be set in the first multi-functional peripheral is changed to a content that can be set in the first multi-functional peripheral, and the new content is reset. As a result, the first multi-functional peripheral can accept the setting information of the second multi-functional peripheral as much as possible.

In addition, the first multi-functional peripheral can accept the setting information of the second multi-functional peripheral in a modified setting state.

The first multi-functional peripheral transmits a logout instruction to the second multi-functional peripheral. This prevents the second multi-functional peripheral from being left in the login state, thus improving the security of the system.

[Modification 1 of Third Embodiment]

Modification 1 of the third embodiment will now be described.

In the third embodiment, if another multi-functional peripheral into which one user has logged has setting information different from that set by default, the setting information of this multi-functional peripheral is set in a newly logged-in multi-functional peripheral. In Modification 1, if another multi-functional peripheral into which one user has logged has setting information that has a predetermined number or more, for example, three, of setting items having values different from default values, the setting information of this multi-functional peripheral is set in a newly logged-in multi-functional peripheral. Other configurations and processes are the same as in the third embodiment.

The predetermined number is a reference for determining whether the setting information of another multi-functional peripheral is set in a newly logged-in multi-functional peripheral, and can be appropriately varied.

In Modification 1, a user A also logs into the multi-functional peripheral 10*a*.

Figure 28:
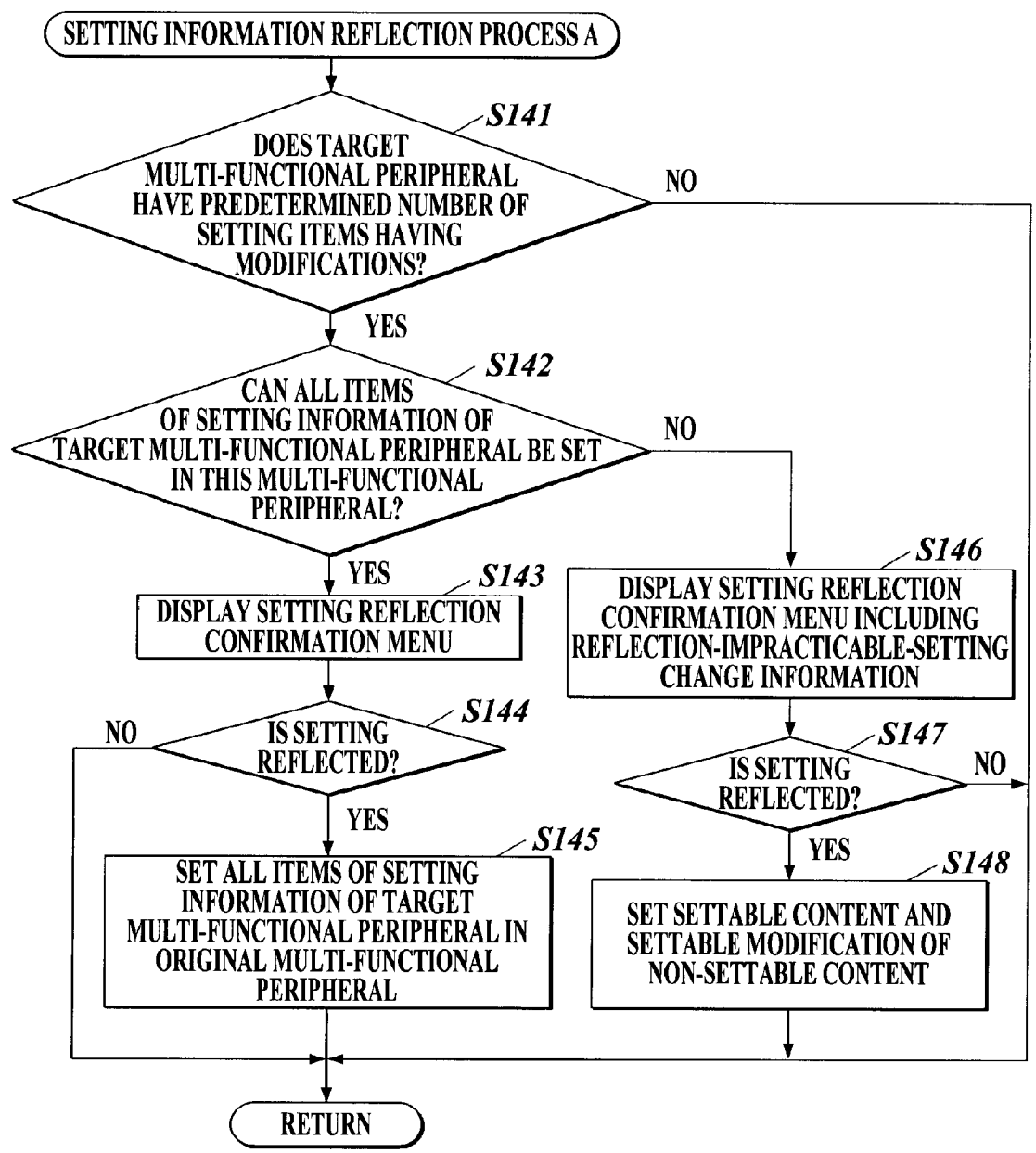
FIG. 28 is a flowchart illustrating a setting information reflection process A in Modification 1 of the third embodiment.

In Modification 1, the multi-functional peripheral 10*a* performs a setting information reflection process A shown in FIG. 28 instead of the setting information reflection process shown in FIG. 21.

The CPU 11 checks for the existence of modifications from default values for a predetermined number or more of setting items in the target multi-functional peripheral, namely, checks for the existence of a predetermined number or more of setting items having values different from default values in setting information of the target multi-functional peripheral, on the basis of the setting information of the target multi-functional peripheral (step S141).

In the target multi-functional peripheral, if the predetermined number or more of setting items each have a modification from the default value (step S141; YES), the process shifts to step S142.

In contrast, if the number of setting items each having a modification from the default value of the target multi-functional peripheral is less than the predetermined number (step S141; NO), the setting information of the target multi-functional peripheral is not set in the multi-functional peripheral 10*a*, and the setting information reflection process A is finished.

The process of steps S142 to S148 in FIG. 28 are the same as that of steps S112 to S118 in FIG. 21, and duplicated description is omitted.

As described above, according to Modification 1 of the third embodiment, which has advantageous effects similar to those in the third embodiment, one multi-functional peripheral can accept the setting information of another multi-functional peripheral into which the same user has logged having a predetermined number or more of setting items having modifications.

In contrast, one multi-functional peripheral need not accept the setting information of another multi-functional peripheral that has setting items having modifications from default values where the number of the modified setting items is less than the predetermined number, thus eliminating unnecessary processing.

[Modification 2 of Third Embodiment]

Modification 2 of the third embodiment will now be described.

In the third embodiment, if another multi-functional peripheral into which one user has logged has setting information different from that set by default, the setting information of this multi-functional peripheral is set in a newly logged-in multi-functional peripheral. In Modification 2, if another multi-functional peripheral into which one user has logged has setting information that has a predetermined setting item having a value different from a default value, the setting information of this multi-functional peripheral is set in a newly logged-in multi-functional peripheral. Other configurations and processes are the same as in the third embodiment.

The predetermined setting item is a reference for determining whether the setting information of another multi-functional peripheral is set in a newly logged-in multi-functional peripheral, and can be appropriately varied.

For example, if another multi-functional peripheral into which one user has logged has a setting item on adjustment of image quality in a state modified from a state set by default, the setting information of this multi-functional peripheral is set in a newly logged-in multi-functional peripheral so as to maximize the finely adjusted image quality according to a requirement of the user. The setting items on adjustment of image quality include density, lightness, contrast, and chroma.

If a function defined by a combination of a plurality of setting items has been set in another multi-functional peripheral into which one user had logged, the setting information of this multi-functional peripheral is set in a newly logged-in multi-functional peripheral so as to maximize the set items. The function defined by a combination of a plurality of setting items includes expanded consecutive shooting.

In Modification 2, a user A also logs into the multi-functional peripheral 10a.

Figure 29:
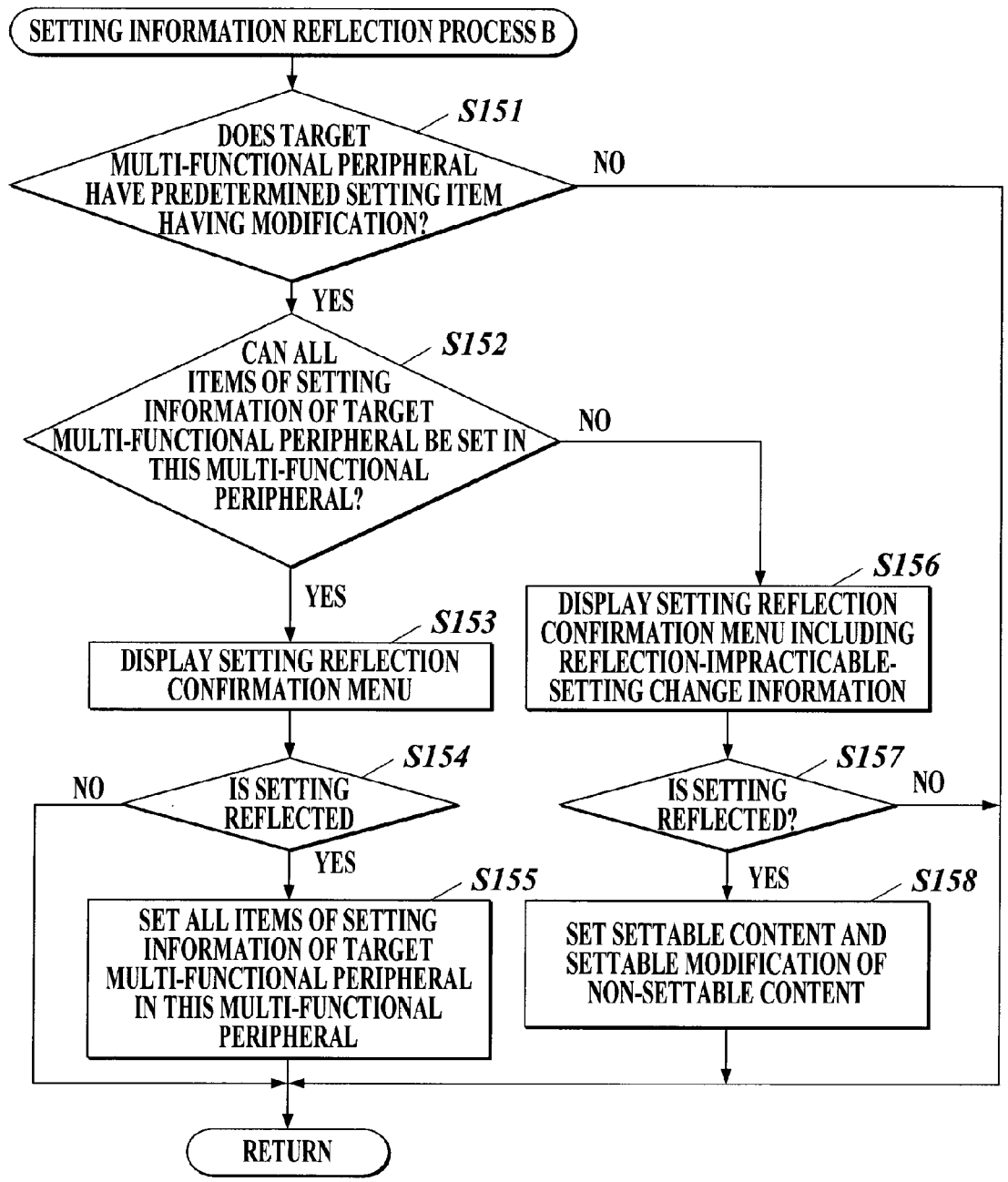
FIG. 29 is a flowchart illustrating a setting information reflection process B in modification 2 of the third embodiment.

In Modification 2, the multi-functional peripheral 10a performs a setting information reflection process B shown in FIG. 29 instead of the setting information reflection process shown in FIG. 21.

The CPU 11 checks for the existence of a modification from a default value of a target multi-functional peripheral for a predetermined setting item in the target multi-functional peripheral, namely, checks for the existence of a predetermined setting item having a value different from a default value in setting information of the target multi-functional peripheral, on the basis of the setting information of the target multi-functional peripheral (step S151). For example, the CPU 11 checks for existence of a modification from a default value for a setting item on adjustment of image quality, and for a setting item defined by a combination of a plurality of setting items, such as expanded consecutive shooting.

If the target multi-functional peripheral has the predetermined setting item having a modification from the default value (step S151; YES), the process shifts to step S152.

In contrast, if the target multi-functional peripheral has the predetermined setting item having the default value (step S151; NO), the setting information of the target multi-functional peripheral is not set in the multi-functional peripheral 10a, and the setting information reflection process B is finished.

The process of steps S152 to S158 in FIG. 29 is the same as that of steps S112 to S118 in FIG. 21, and duplicated description is omitted.

As described above, according to Modification 2 of the third embodiment, which has advantageous effects similar to those in the third embodiment, one multi-functional peripheral can accept the setting information of another multi-functional peripheral into which the same user has logged having a predetermined setting item having a modification. In particular, operability in setting of a multi-functional peripheral can be improved for an important setting item in image formation and a setting item taking much time for setting.

Fourth Embodiment

A fourth embodiment of the present invention will now be described.

An image forming system of the fourth embodiment has the same configuration as that of the image forming system 200 shown in the second embodiment, and thus FIG. 11 is referred and duplicated illustration and description are omitted. The multi-functional peripherals 10a, 10b, . . . , 10n each also have the same configuration as in the first embodiment except that a server 40 controls first authentication information, and thus FIG. 2 is referred and duplicated illustration and description are omitted. In addition, the server 40 is the same as that in the second embodiment, and thus FIG. 12 is referred and duplicated illustration and description are omitted. A configuration and a process inherent in the fourth embodiment will now be described.

A CPU 11 of the multi-functional peripheral 10a as a second controller transmits second authentication information received from the operational unit 15 to the server 40 through the network I/F unit 20.

The CPU 11 of the multi-functional peripheral 10a checks for permission of logging into the multi-functional peripheral 10a on the basis of the authentication result received from the server 40 through the network I/F unit 20.

If a user logs into/out from the multi-functional peripheral 10a, the CPU 11 of the multi-functional peripheral 10a transmits the information indicating login/logout of the user to/from the multi-functional peripheral 10a to the server 40 through the network I/F unit 20.

If a setting change operation is performed in the operational unit 15, the CPU 11 of the multi-functional peripheral 10a updates the setting information stored in the storage unit 14, and transmits the updated setting information to the server 40 through the network I/F unit 20.

If one user logs into the multi-functional peripheral 10a, the CPU 11 of the multi-functional peripheral 10a acquires setting information of another multi-functional peripheral into which one user has logged from the server 40 through the network I/F unit 20, and sets the setting information of this multi-functional peripheral in the multi-functional peripheral 10a. Here, if the setting information of the relevant multi-functional peripheral is different from that set by default of the multi-functional peripheral, the CPU 11 sets the setting information of this multi-functional peripheral in the multi-functional peripheral 10a.

If a certain setting content in the setting information of the relevant multi-functional peripheral cannot be set in the multi-functional peripheral 10a, the CPU 11 of the multi-functional peripheral 10a informs the multi-functional peripheral of such a state, and changes such a non-settable content to a content settable in the multi-functional peripheral 10a, and resets the new content.

The other multi-functional peripherals 10b, . . . , 10n each have the same configuration as that of the multi-functional peripheral 10a; hence, the same numerals are used therein and duplicated description is omitted.

The storage unit 44 of the server 40 stores first authentication information (a user name and a password) corresponding to a registered user that is permitted to log into each of the multi-functional peripherals 10a, 10b, . . . , 10n.

In addition, the storage unit 44 stores login state information indicating a login state of a user corresponding to each of the multi-functional peripherals 10a, 10b, . . . , 10n. The login state information includes information indicating the presence of a user that has logged in for each multi-functional peripheral, and a name of the user that has logged in.

In addition, the storage unit 44 stores setting information of each of the multi-functional peripherals 10a, 10b, . . . , 10n. The setting information includes a set value and information indicating the state of a modification from a default value for individual setting items.

The CPU 41 as a first controller transmits an authentication result indicating a matching state of the second authentication information sent from one of the multi-functional peripherals 10a, 10b, . . . , 10n through the network I/F unit 47 with the first authentication information stored in the storage unit 44 to a multi-functional peripheral as a source of the second authentication information.

The CPU 41 receives information indicating login/logout of a user to/from one of the multi-functional peripherals 10a, 10b, . . . , 10n from this multi-functional peripheral through the network I/F unit 47, and updates login state information of the multi-functional peripheral stored in the storage unit 44 on the basis of such received information.

The CPU 41 acquires setting information of each of the multi-functional peripherals 10a, 10b, . . . , 10n at a predetermined timing through the network I/F unit 47. Here, if the multi-functional peripherals 10a, 10b, . . . , 10n are in modified setting states, the CPU 41 acquires setting information sent from the multi-functional peripherals 10a, 10b, . . . , 10n.

The CPU 41 receives setting information of one of the multi-functional peripherals 10a, 10b, . . . , 10n from this multi-functional peripheral through the network I/F unit 47, and updates the setting information of the multi-functional peripheral stored in the storage unit 44 on the basis of such received setting information.

If one user logs into one of the multi-functional peripherals 10a, 10b, . . . , 10n, the CPU 41 checks for the existence of another multi-functional peripheral into which the user has logged. In detail, the CPU 41 checks for the existence of another multi-functional peripheral into which the user has logged, on the basis of the login state information for individual multi-functional peripherals stored in the storage unit 44.

If the CPU 41 determines the existence of another multi-functional peripheral into which one user has logged, the CPU 41 transmits the setting information of this multi-functional peripheral stored in the storage unit 44 to a multi-functional peripheral into which the user newly logs, through the network I/F unit 47.

The CPU 41 thus transmits the setting information of the relevant multi-functional peripheral to the newly logged-in multi-functional peripheral, and then transmits an instruction of logout of the user to the relevant multi-functional peripheral through the network I/F unit 47.

An operation of the image forming system 200 will now be described.

In the following description, a user A logs into the multi-functional peripheral 10a.

Figure 30:
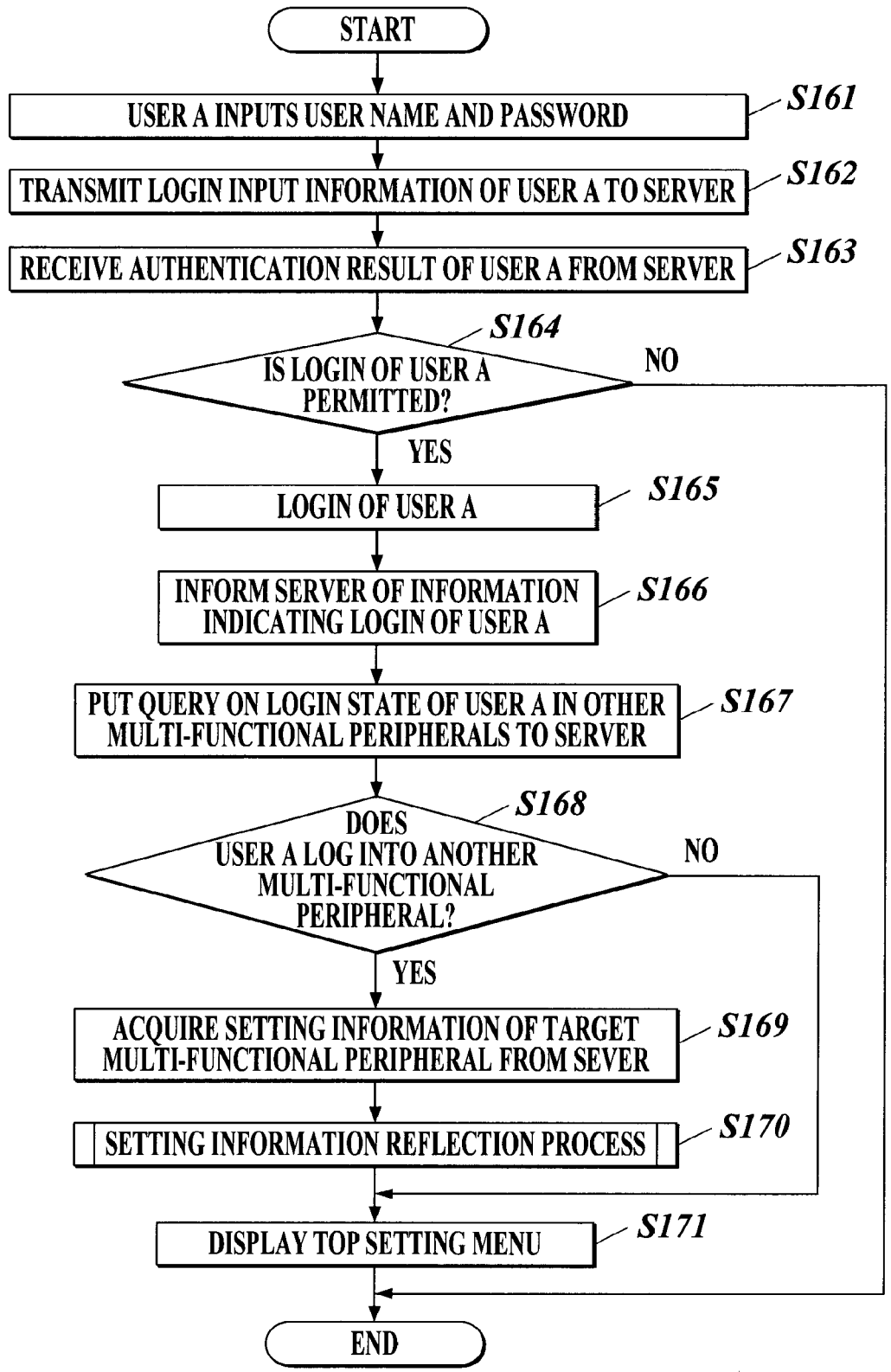
FIG. 30 is a flowchart illustrating a process executed by one multi-functional peripheral of a fourth embodiment.

FIG. 30 is a flowchart illustrating a process executed by the multi-functional peripheral 10a. This process is achieved by software processing through cooperation of the CPU 11 with a program stored in the ROM 12.

A user name and a password (the second authentication information) of the user A are input through an operation from the operational unit 15 by a user (step S161). The CPU 11 then sends the login input information (the second authentication information) of the user A received from the operational unit 15 to the server 40 through the network I/F unit 20 (step S162).

The CPU 11 then receives an authentication result of the user A from the server 40 through the network I/F unit 20 (step S163). The CPU 11 then checks for the permission state of login of the user A to the multi-functional peripheral 10a (step S164). In detail, the CPU 11 checks for the permission state of login of the user A to the multi-functional peripheral 10a on the basis of the authentication result sent from the server 40.

If the CPU 11 determines permission of login of the user A to the multi-functional peripheral 10a (step S164; YES), the CPU 11 allows the user A to log into the multi-functional peripheral 10a (step S165), and informs the server 40 of information indicating login of the user A to the multi-functional peripheral 10a through the network I/F unit (step S166).

The CPU 11 then puts a query on a login state of the user A to each of the other multi-functional peripherals 10b, . . . , 10n to the server 40 through the network I/F unit 20 (step S167). The CPU 11 then receives login state information of each of the multi-functional peripherals 10b, . . . , 10n from the server 40 through the network I/F unit 20. The CPU 11 may receive information indicating a multi-functional peripheral into which the user A has logged from the server 40.

If the user A logs into one of the multi-functional peripherals 10b, . . . , 10n (step S168; YES), the CPU 11 acquires setting information of a target multi-functional peripheral into which the user A has logged from the server 40 through the network I/F unit 20 (step S169). In detail, the CPU 11 transmits an acquisition requirement of the setting information of the target multi-functional peripheral to the server 40 through the network I/F unit 20, and then receives the setting information of the target multi-functional peripheral transmitted from the server 40. The CPU 11 thus acquires the setting information of the target multi-functional peripheral and stores the setting information in the RAM 13.

The CPU 11 then performs a setting information reflection process (step S170).

The setting information reflection process is the same as the setting information reflection process shown in FIG. 21 in the third embodiment, and duplicated description is omitted.

If the user A does not log into any of the other multi-functional peripherals 10b, . . . , 10n in step S168 (step S168; NO), or after step S170 is completed, the CPU 11 displays a top setting menu on the display unit 16 (step S171).

If the login of the user A to the multi-functional peripheral 10a is not permitted in step S164 (step S164; NO), or after step S171 is completed, the process executed by the multi-functional peripheral 10a is finished.

Figure 31:
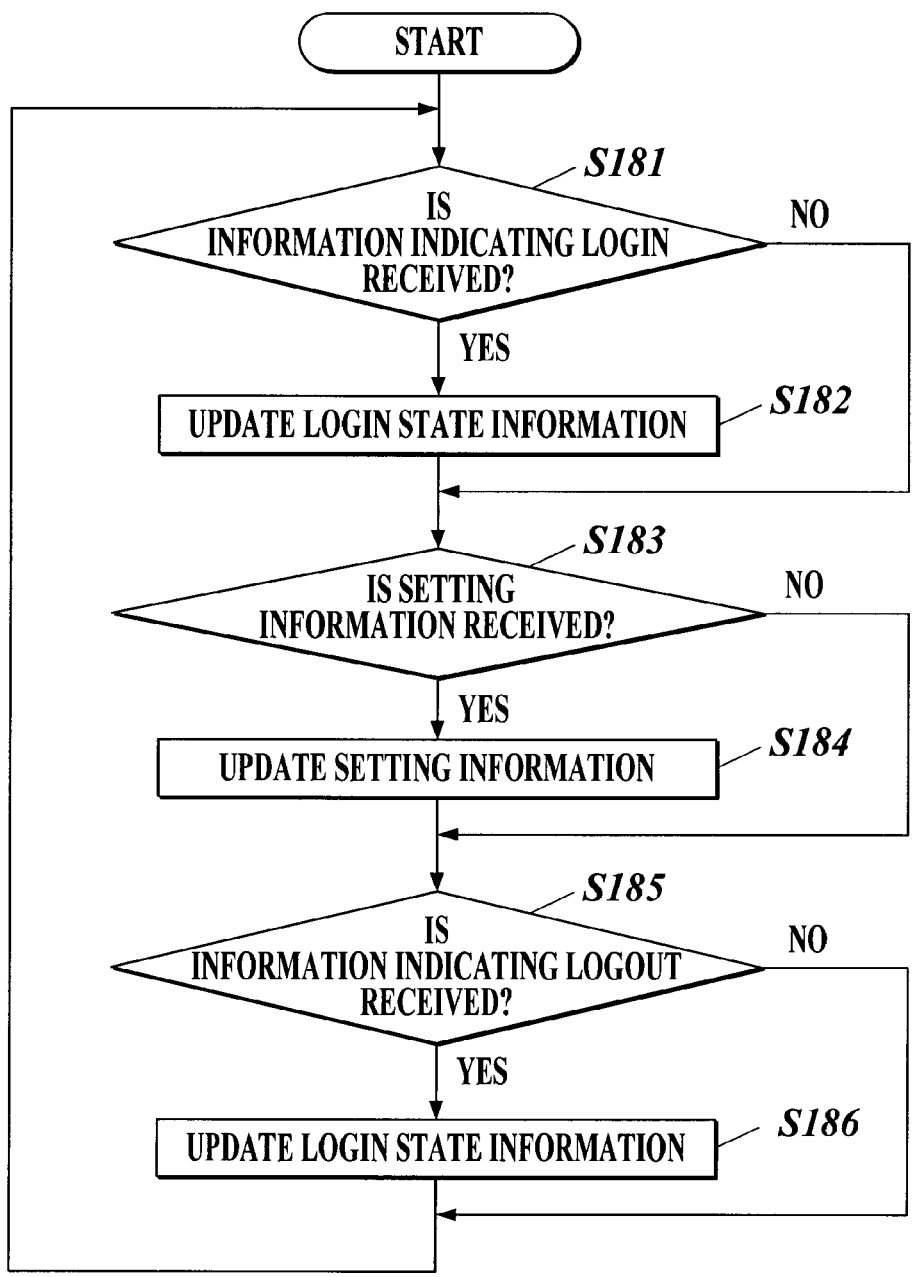
FIG. 31 is a flowchart illustrating a login state control process executed by a server in the fourth embodiment.

FIG. 31 is a flowchart illustrating a login-state control process executed by the server 40. This process is achieved by software processing through cooperation of the CPU 41 with a program stored in the storage unit 44.

If the CPU 41 receives information indicating login of a user to one of the multi-functional peripherals 10a, 10b, 10n from this multi-functional peripheral through the network I/F unit 47 (step S181; YES), the CPU 41 updates the login state information of the multi-functional peripheral stored in the storage unit 44 (step S182). In detail, the CPU 41 changes "information indicating the presence of a login user" included in the login state information of the relevant multi-functional peripheral to "a login user", and adds a user name of the user that logs into the multi-functional peripheral.

If the CPU 41 does not receive the information indicating login of a user in step S181 (step S181; NO), or if the CPU 41 receives setting information of one of the multi-functional peripherals 10a, 10b, . . . , 10n from this information through the network I/F unit 47 after step S182 is completed (step S183; YES), the CPU 41 updates the setting information of the multi-functional peripheral stored in the storage unit 44 (step S184).

If the CPU 41 does not receive the setting information in step S183 (step S183; NO), or if the CPU 41 receives the information indicating logout of a user from one of the multi-functional peripherals 10a, 10b, . . . , 10n from this multi-functional peripheral through the network I/F unit 47 after step S184 is completed (step S185; YES) the CPU 41 updates the login state information of the multi-functional peripheral stored in the storage unit 44 (step S186). In detail, the CPU 41 changes "information indicating the presence of a login user" included in the login state information of the relevant multi-functional peripheral to "no login user", and deletes the user name of the user that has logged into the multi-functional peripheral.

If the CPU 41 does not receive the information indicating logout of a user in step S185 (step S185; NO), or after step S186 is completed, the process returns to step S181, which is then repeated.

Figure 32:
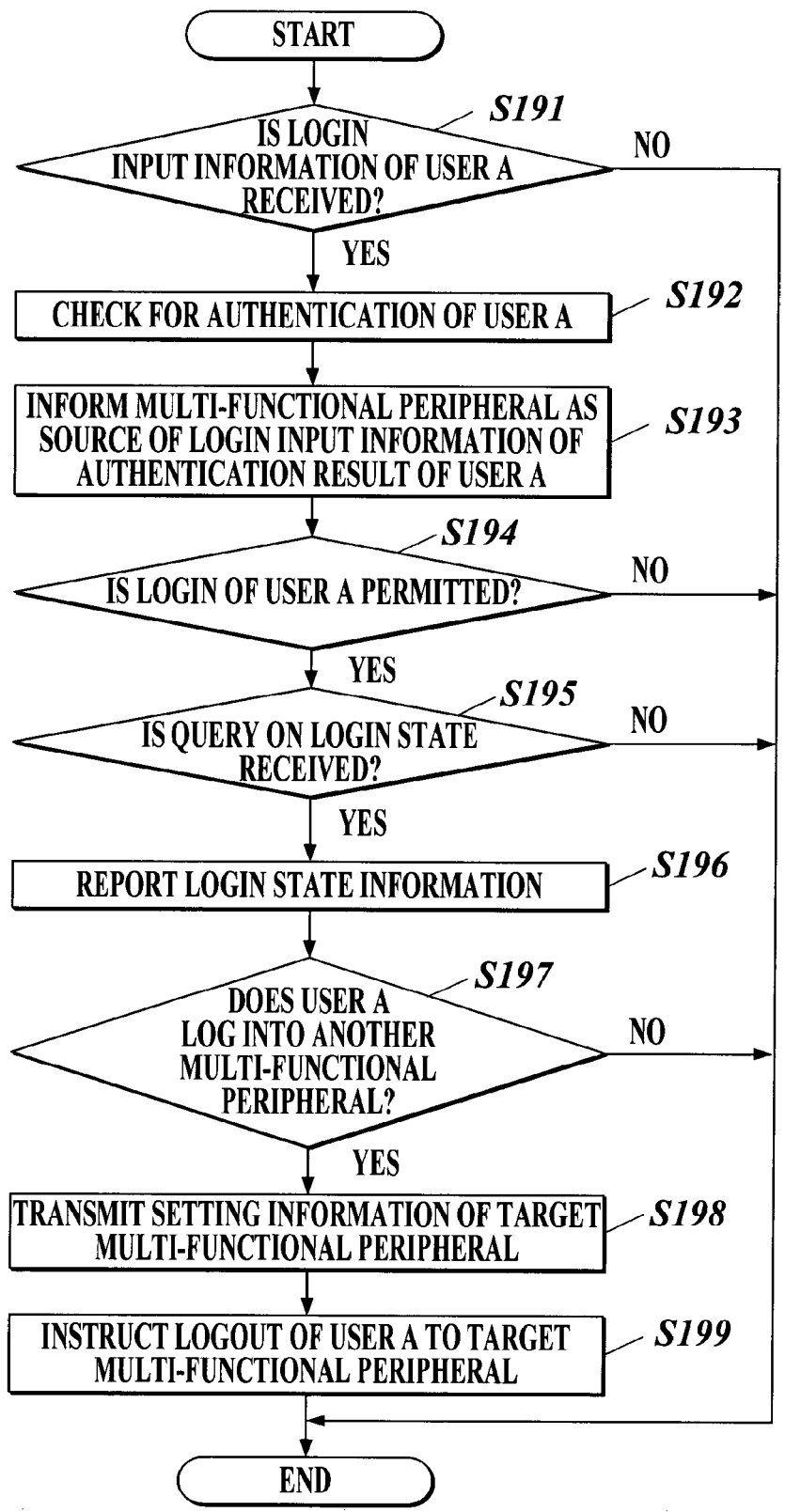
FIG. 32 is a flowchart illustrating a setting information transmission process executed by the server in the fourth embodiment.

FIG. 32 is a flowchart illustrating a setting information transmission process executed by the server 40. This process is executed during the login of the user A to the multi-functional peripheral 10a, and is achieved by software processing through cooperation of the CPU 41 with a program stored in the storage unit 44.

If the CPU 41 receives the login input information (the second authentication information) of the user A from the multi-function peripheral 10a through the network I/F unit 47 (step S191; YES), the CPU 41 checks for authentication of the user A (step S192). In detail, the CPU 41 checks for a matched state between the second authentication information received from the multi-functional peripheral 10a and the first authentication information stored in the storage unit 44.

The CPU 41 then informs the multi-functional peripheral 10a as a source of the login input information of the authentication result of the user A through the network I/F unit (step S193).

The CPU 41 then checks for the permission state of login of the user A (step S194). If login of the user A is permitted (step S194; YES), namely, if the second authentication information received from the multi-functional peripheral 10a matches the first authentication information stored in the storage unit 44, the CPU 41 receives information indicating login of a user A to the multi-functional peripheral 10a from the multi-functional peripheral 10a through the network I/F unit 47, and the CPU 41 updates the login state information of the relevant multi-functional peripheral stored in the storage unit 44 (see steps S181 and S182 in FIG. 31).

The CPU 41 then checks for the existence of a query on a login state of the user A from the multi-functional peripheral 10a (step S195). If the CPU 41 determines the query on a login state of the user A from the multi-functional peripheral 10a (step S195; YES), the CPU 41 informs the multi-functional peripheral 10a of the login state information of each of the other multi-functional peripherals 10b, 10n through the network I/F unit 47 (step S196). Alternatively, the server 40 may inform the multi-functional peripheral 10a of the information indicating a multi-functional peripheral into which the user A has logged.

The CPU 41 then checks for the login state of the user A to each of the other multi-functional peripherals 10b, . . . , 10n (step S197). In detail, the CPU 41 reads the login state information stored in the storage unit 44 to check for the login state of the user A to each of the other multi-functional peripherals 10b, . . . , 10n.

If the user A logs into one of the other multi-functional peripherals 10b, . . . , 10n (step S197; YES), the CPU 41 transmits the setting information of the target multi-functional peripheral into which the user A logs to the multi-functional peripheral 10a through the network I/F unit 47 (step S198).

The CPU 41 then transmits a logout instruction of the user A to the target multi-functional peripheral into which the user A logs through the network I/F unit 47 (step S199).

If the CPU 41 does not receive the login input information of the user A from the multi-functional peripheral 10a in step S191 (step S191; NO), if the login of the user A is not permitted in step S194 (step S194; NO), if no query on a login state of the user A is received from the multi-functional peripheral 10a in step S195 (step S195; NO), if the user A does not log into any of the other multi-functional peripherals 10b, 10n in step S197 (step S197; NO), or after step S199 is completed, the setting information transmission process is finished.

FIG. 33 is a flowchart illustrating a process executed by a multi-functional peripheral (here, the multi-functional peripheral 10b is exemplified) into which the user A has logged before logging into the multi-functional peripheral 10a among the multi-functional peripherals 10b, . . . , 10n other than the multi-functional peripheral 10a. This process is achieved by software processing through cooperation of the CPU 11 with a program stored in the ROM 12.

If the user A logs into the multi-functional peripheral 10b (step S201; YES), the CPU 11 checks for the existence of a setting change operation through an operation from the operational unit 15 (step S202). If the CPU 11 determines the setting change operation (step S202; YES), the CPU 11 updates the setting information of the multi-functional peripheral 10b stored in the storage unit 14 on the basis of the setting change operation (step S203), and transmits the setting information of the multi-functional peripheral 10b to the server 40 through the network I/F unit 20 (step S204).

If the CPU 11 determines no setting change operation in step S202 (step S202; NO), or after step S204 is completed, the CPU 11 determines whether a print job is started (step S205). If the print job is started (step S205; YES), the CPU 11 controls the image forming unit 18 to execute the print job (step S206).

If the print job is not started in step S205 (step S205; NO), or after step S206 is completed, the CPU 11 determines whether the multi-functional peripheral 10*b* receives a logout instruction of the user A from the server 40 through the network I/F unit 20 (step S207).

If the CPU 11 determines no reception of the logout instruction of the user A (step S207; NO), the CPU 11 determines whether a predetermined time has passed without input from the operational unit 15 (step S208). If the predetermined time has not passed without input from the operational unit 15 (step S208; NO), the process returns to step S202, and steps S202 to S208 are repeated.

If the multi-functional peripheral 10*b* receives the logout instruction of the user A from the sever 40 in step S207 (step S207; YES), or if the predetermined time has passed without input from the operational unit 15 in step S208 (step S208; YES), the CPU 11 performs the logout operation for the user A (step S209). The CPU 11 then informs the server 40 of the information indicating logout of the user A from the multi-functional peripheral 10*b* through the network I/F unit 20 (step S210).

If the user A does not log into the multi-functional peripheral 10*b* in step S201 (step S201; NO), or after step S210 is completed, the process executed by the multi-functional peripheral 10*b* is finished.

While the multi-functional peripheral 10*b* has been exemplified among the multi-functional peripherals 10*b*, . . . , 10*n* other than the multi-functional peripheral 10*a*, the other multi-functional peripherals also have similar functions.

As described above, according to the fourth embodiment, if one user logs into a first multi-functional peripheral among the multi-functional peripherals 10*a*, 10*b*, . . . , 10*n*, setting information of a second multi-functional peripheral into which the user has logged is acquired from the server 40, and the setting information of the second multi-functional peripheral is set in the first multi-functional peripheral, thus improving operability in setting of the multi-functional peripheral. As a result, setting information of the second multi-functional peripheral can be readily transferred to the first multi-functional peripheral, thus eliminating a troublesome reset operation in the first multi-functional peripheral.

In addition, the server 40 can check for the existence of the second multi-functional peripheral into which the user has logged on the basis of the login state information stored in the storage unit 44.

In addition, a content that cannot be set in the first multi-functional peripheral is changed to a content that can be set in the first multi-functional peripheral, and the new content is reset. As a result, the first multi-functional peripheral can accept the setting information of the second multi-functional peripheral as much as possible.

In addition, the first multi-functional peripheral can accept the setting information of the second multi-functional peripheral in a modified setting state.

The server 40 transmits a logout instruction to the second multi-functional peripheral. This prevents the second multi-functional peripheral from being left in the login state, thus improving the security of the system.

[Modification 1 of Fourth Embodiment]

Modification 1 of the fourth embodiment will now be described.

In the fourth embodiment, if another multi-functional peripheral into which one user has logged has setting information different from that set by default, the setting information of this multi-functional peripheral is set in a newly logged-in multi-functional peripheral. In Modification 1, if another multi-functional peripheral into which one user has logged has setting information that has a predetermined number or more of setting items having values different from default values, the setting information of this multi-functional peripheral is set in a newly logged-in multi-functional peripheral. Other configurations and processes are the same as in the fourth embodiment.

The predetermined number is a reference for determining whether the setting information of another multi-functional peripheral is set in a newly logged-in multi-functional peripheral, and can be appropriately varied.

In Modification 1, a user A also logs into the multi-functional peripheral 10*a*.

In Modification 1, the multi-functional peripheral 10*a* performs the setting information reflection process A shown in FIG. 28 instead of the setting information reflection process (step S170) included in the process shown in FIG. 30.

As described above, according to Modification 1 of the fourth embodiment, which has advantageous effects similar to those in the fourth embodiment, one multi-functional peripheral can accept the setting information of another multi-functional peripheral into which the same user has logged having a predetermined number or more of setting items having modifications.

[Modification 2 of Fourth Embodiment]

Modification 2 of the fourth embodiment will now be described.

In the fourth embodiment, if another multi-functional peripheral into which one user has logged has setting information different from that set by default, the setting information of this multi-functional peripheral is set in a newly logged-in multi-functional peripheral. In Modification 2, if another multi-functional peripheral into which one user has logged has setting information that has a predetermined setting item having a value different from a default value, the setting information of this multi-functional peripheral is set in a newly logged-in multi-functional peripheral. Other configurations and processes are the same as in the fourth embodiment.

The predetermined setting item is a reference for determining whether the setting information of another multi-functional peripheral is set in a newly logged-in multi-functional peripheral, and can be appropriately varied.

In Modification 2, a user A also logs into the multi-functional peripheral 10*a*.

In Modification 2, the multi-functional peripheral 10*a* performs a setting information reflection process B shown in FIG. 29 instead of the setting information reflection process (step S170) shown in FIG. 30.

As described above, according to Modification 2 of the fourth embodiment, which has advantageous effects similar to those in the fourth embodiment, one multi-functional peripheral can accept the setting information of another multi-functional peripheral into which the same user has logged having a predetermined setting item having a modification.

In the fourth embodiment and Modifications 1 and 2 thereof, every time a login/logout operation is performed to/from or setting is changed in the multi-functional peripherals 10*a*, 10*b*, . . . , 10*n*, the relevant multi-functional peripheral informs the server 40 of the login or logout operation. Alternatively, a multi-functional peripheral may inform the server 40 of the login state and the setting information of the multi-functional peripheral in response to a query from the sever 40. For example, if the CPU 41 of server 40 receives the information indicating login of a user from one of the multi-functional peripherals 10*a*, 10*b*, . . . , 10*n* through the network I/F unit 47, the CPU 41 may put a query on a login state of the user to each of the other multi-functional peripherals through the network I/F unit 47 to acquire the setting information of a multi-functional peripheral into which the user logs from the multi-functional peripheral.

The embodiments have been described as, but are not limited to, examples of the image forming system according to the present invention. A detailed configuration and a detailed operation of each device defining the system may also be appropriately modified or altered within the scope without departing from the spirit of the present invention.

For example, different users may be permitted to log into individual multi-functional peripherals in the image forming system.

While the above description discloses a semiconductor memory or a hard disc used as a computer-readable medium that stores programs for executing various types of processing, this is illustrative only. A portable recording medium such as CD-ROM may be used as another computer-readable medium. In addition, a carrier wave may be used as a medium providing program data through a communication line.

What is claimed is:

1. An image forming system comprising:
   a plurality of image forming devices connected in data communication with each other via a network, each of the image forming devices including:
      a first storage unit that stores first authentication information corresponding to a user permitted to log into a relevant image forming device;
      a second storage unit that stores setting information of the relevant image forming device;
      an operational unit for input of second authentication information; and
      a controller that permits logging into the relevant image forming device if the second authentication information received from the operational unit matches the first authentication information stored in the first storage unit;
   wherein if one user logs into a first image forming device among the image forming devices, a controller of the first image forming device checks for the existence of a second image forming device into which the user is currently logged; and
   wherein, if the controller determines the second image forming device into which the user is currently logged, the controller acquires the setting information stored in the second storage unit of the second image forming device from the second image forming device, and sets the setting information of the second image forming device in the first image forming device.

2. The image forming system according to claim 1, wherein the controller of the first image forming device puts a query on a login state of the user to all other image forming devices among the image forming devices, and checks for the existence of the second image forming device into which the user is currently logged based on a result of the query.

3. The image forming system according to claim 1, wherein if a certain setting content in the setting information of the second image forming device is not settable in the first image forming device, the controller of the first image forming device informs the second image forming device of such a state, and changes such a non-settable content to a content settable in the first image forming device, and resets the new content.

4. The image forming system according to claim 1, wherein if the second image forming device has setting information different from that set by default, the controller of the first image forming device sets the setting information of the second image forming device in the first image forming device.

5. The image forming system according to claim 1, wherein if the second image forming device has setting information having a predetermined number or more of setting items having values different from default values, the controller of the first image forming device sets the setting information of the second image forming device in the first image forming device.

6. The image forming system according to claim 1, wherein if the second image forming device has setting information having a predetermined setting item having a value different from a default value, the controller of the first image forming device sets the setting information of the second image forming device in the first image forming device.

7. The image forming system according to claim 1, wherein the controller of the first image forming device sets the setting information of the second image forming device in the first image forming device, and then transmits a logout instruction of the user to the second image forming device.

8. The image forming system according to claim 1, wherein, if the one user logs into the first image forming device among the image forming devices and the controller of the first image forming device determines the second image forming device into which the user is currently logged, the controller of the first image forming device acquires the setting information stored in the second storage unit of the second image forming device from the second image forming device, and sets the setting information of the second image forming device in the first image forming device to execute the job.

9. The image forming system according to claim 1, wherein:
   the second storage unit stores setting information of the image forming device which is updated when a setting change operation is performed in the image forming device; and
   if the one user logs into the first image forming device among the image forming devices and the controller of the first image forming device determines the second image forming device into which the user is currently logged, the controller of the first image forming device acquires the setting information stored in the second storage unit of the second image forming device from the second image forming device, and the setting information of the second image forming device is transferred to the first image forming device.

10. An image forming system comprising:
    a plurality of image forming devices; and
    a server connected in data communication with the image forming devices via a network,
    the server including:
       a storage unit that stores first authentication information corresponding to a user permitted to log into each of the image forming devices; and
       a first controller that transmits an authentication result indicating a matched state of the second authentication information received from one of the image forming devices with the first authentication information stored in the storage unit to an image forming device as a source of the second authentication information, and acquires setting information of each of the image forming devices at a predetermined timing; and
    each of the image forming devices including:
       an operational unit for input of the second authentication information; and a second controller that transmits the second authentication information received from the operational unit to the server, and checks for permission of logging into the relevant image forming device based on an authentication result received from the server;

wherein if one user logs into a first image forming device among the image forming devices, (i) the first controller checks for the existence of a second image forming device into which the user is currently logged, and if the first controller determines the second image forming device into which the user is currently logged, the first controller transmits the acquired setting information of the second image forming device to the first image forming device, and (ii) the second controller of the first image forming device acquires the setting information of the second image forming device from the server, and sets the setting information of the second image forming device in the first image forming device.

11. The image forming system according to claim 10, wherein:
the server further includes a second storage unit that stores login state information indicating a login state of a user to each of the image forming devices;
the second controller of each of the image forming devices transmits to the server information indicating login/logout of the user to/from the relevant image forming device;
the first controller receives information indicating login/logout of the user to/from one of the image forming devices from this image forming device, and updates the login state information stored in the second storage unit based on the received information; and
the first controller checks for the existence of another image forming device into which the user is currently logged based on the login state information stored in the second storage unit.

12. The image forming system according to claim 10, wherein if a certain setting content in the setting information of the second image forming device is not settable in the first image forming device, the second controller of the first image forming device informs the second image forming device of such a state, and changes such a non-settable content to a content settable in the first image forming device, and resets the new content.

13. The image forming system according to claim 10, wherein if the second image forming device has setting information different from that set by default, the second controller of the first image forming device sets the setting information of the second image forming device in the first image forming device.

14. The image forming system according to claim 10, wherein if the second image forming device has setting information having a predetermined number or more of setting items having values different from default values, the second controller of the first image forming device sets the setting information of the second image forming device in the first image forming device.

15. The image forming system according to claim 10, wherein if the second image forming device has setting information having a predetermined setting item having a value different from a default value, the second controller of the first image forming device sets the setting information of the second image forming device in the first image forming device.

16. The image forming system according to claim 10, wherein the first controller transmits the setting information of the second image forming device to the first image forming device, and then transmits a logout instruction of the user to the second image forming device.

17. The image forming system according to claim 10, wherein, if the one user logs into the first image forming device among the image forming devices and the first controller determines the second image forming device into which the user is currently logged, the second controller acquires the setting information of the second image forming device from the server, and sets the setting information of the second image forming device in the first image forming device to execute the job.

18. The image forming system according to claim 10, wherein:
the setting information of the second image forming device acquired by the server is updated when a setting change operation is performed in the second image forming device; and
if the one user logs into the first image forming device among the image forming devices and the first controller determines the second image forming device into which the user is currently logged, the second controller acquires the updated setting information of the second image forming device from the server, and transfers the updated setting information of the second image forming device to the first image forming device.

19. An image forming device connected in data communication with a plurality of other image forming devices via a network, comprising:
a first storage unit that stores first authentication information corresponding to a user permitted to log into the image forming device as a first image forming device;
a second storage unit that stores setting information of the first image forming device;
an operational unit for input of second authentication information; and
a controller that permits logging into the first image forming device if the second authentication information received from the operational unit matches the first authentication information stored in the first storage unit;
wherein if one user logs into the first image forming device, the controller checks for the existence of a second image forming device into which the user is currently logged; and
wherein if the controller determines the second image forming device into which the user is currently logged, the controller acquires the setting information of the second image forming device from the second image forming device, and sets the setting information of the second image forming device in the first image forming device.

20. The image forming device according to claim 19, wherein, if the one user logs into the first image forming device among the image forming devices and the controller determines the second image forming device into which the user is currently logged, the controller acquires the setting information of the second image forming device from the second image forming device, and sets the setting information of the second image forming device in the first image forming device to execute the job.

21. The image forming device according to claim 19, wherein:
the second storage unit stores setting information of the image forming device which is updated when a setting change operation is performed in the image forming device; and if the one user logs into the first image forming device among the image forming devices and the controller determines the second image forming device into which the user is currently logged, the controller acquires the setting information of the second image forming device from the second image forming device, and the setting information of the second image forming device is transferred to the first image forming device.

* * * * *